US012800081B2

(12) United States Patent
Miyakoshi et al.

(10) Patent No.: US 12,800,081 B2
(45) Date of Patent: Nov. 17, 2026

(54) FLOW PATH CONNECTION MECHANISM AND INKJET RECORDING APPARATUS

(71) Applicant: KYOCERA Document Solutions Inc., Osaka (JP)

(72) Inventors: Naoto Miyakoshi, Osaka (JP); Hironori Daigo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 142 days.

(21) Appl. No.: 19/058,673

(22) Filed: Feb. 20, 2025

(65) Prior Publication Data

US 2025/0269659 A1 Aug. 28, 2025

(30) Foreign Application Priority Data

Feb. 26, 2024 (JP) ................................ 2024-026663

(51) Int. Cl.
*F16L 37/107* (2006.01)
*B41J 2/18* (2006.01)
*F16L 37/252* (2006.01)
*F16L 37/32* (2006.01)

(52) U.S. Cl.
CPC ............... *F16L 37/107* (2013.01); *B41J 2/18* (2013.01); *F16L 37/252* (2013.01); *F16L 37/32* (2013.01)

(58) Field of Classification Search
CPC ..... F16L 37/107; F16L 37/113; F16L 37/248; F16L 37/252; F16L 37/32; B41J 2/175; B41J 2/17596; B41J 2/18
See application file for complete search history.

(56) References Cited

U.S. PATENT DOCUMENTS

| | | | | |
|---|---|---|---|---|
| 2,589,321 A * | 3/1952 | Anderson | ............. | F16L 37/113 285/361 |
| 3,198,555 A * | 8/1965 | Johnson | ................ | E21B 17/046 285/91 |
| 2004/0001126 A1 | 1/2004 | Oda et al. | ....................... | 347/85 |

(Continued)

FOREIGN PATENT DOCUMENTS

| | | |
|---|---|---|
| CN | 112428694 A | 3/2021 |
| JP | 2019-198984 A | 11/2019 |

OTHER PUBLICATIONS

Extended European Search Report dated Jul. 15, 2025, Issued by the European Patent Office in corresponding application EP 25159530.2.

*Primary Examiner* — Kevin F Murphy
*Assistant Examiner* — Jonathan J Waddy
(74) *Attorney, Agent, or Firm* — Stein IP, LLC

(57) ABSTRACT

A first coupling member includes a connecting protrusion. The first coupling member is inserted into a connection member, and thus respective concavo-convex structures of the first coupling member and a second coupling member engage with each other in a circumferential direction. The connection member has a guide groove. A rotation angle of the connection member by which the connection member is rotated from a state where the connecting protrusion fitted into the guide groove abuts on one side surface of the guide groove in the circumferential direction to a state where the connecting protrusion abuts on the other side surface of the guide groove in the circumferential direction is not less than ½ of a prescribed periodic angle.

4 Claims, 24 Drawing Sheets

(56) References Cited

U.S. PATENT DOCUMENTS

| | | | | |
|---|---|---|---|---|
| 2007/0025811 | A1* | 2/2007 | Wilhelm | F16L 37/34 403/300 |
| 2009/0214287 | A1* | 8/2009 | Usui | F16L 37/113 403/42 |
| 2015/0276110 | A1* | 10/2015 | Parekh | F16L 37/107 285/307 |
| 2019/0344574 | A1 | 11/2019 | Maeshima | B41J 2/17513 |
| 2025/0269651 | A1* | 8/2025 | Miyakoshi | B41J 2/17523 |
| 2025/0269652 | A1* | 8/2025 | Miyakoshi | B41J 2/175 |
| 2025/0269655 | A1* | 8/2025 | Miyakoshi | F16L 37/252 |
| 2025/0269656 | A1* | 8/2025 | Miyakoshi | B41J 2/17523 |
| 2025/0269657 | A1* | 8/2025 | Miyakoshi | B41J 2/17523 |
| 2025/0269658 | A1* | 8/2025 | Miyakoshi | B41J 2/175 |
| 2025/0327542 | A1* | 10/2025 | Spengler | A47L 7/0095 |
| 2026/0160367 | A1* | 6/2026 | Miyakoshi | B41J 2/175 |

* cited by examiner

FLOW PATH CONNECTION MECHANISM AND INKJET RECORDING APPARATUS

INCORPORATION BY REFERENCE

This application is based upon and claims the benefit of priority from the corresponding Japanese Patent Application No. 2024-026663 filed on Feb. 26, 2024, the entire contents of which are hereby incorporated by reference.

BACKGROUND

The present disclosure relates to a flow path connection mechanism and an inkjet recording apparatus that allow circulation of a liquid.

Inkjet recording apparatuses use ink as a liquid. In other words, inkjet recording apparatuses allow ink circulation therein.

In order to allow ink circulation, such an inkjet recording apparatus is provided with a flow path connection mechanism including, for example, a coupling member connected to a tube. The flow path connection mechanism includes, for example, a pair of coupling members.

SUMMARY

A flow path connection mechanism according to a first aspect of the present disclosure includes a first coupling member, a second coupling member, and a connection member. The first coupling member is a tubular body whose center axis is an axis extending in a prescribed direction and includes inside a circulation path for a liquid. The second coupling member is a tubular body centered about the center axis, is connected to the first coupling member in an axis direction, and includes inside a circulation path for the liquid so that the liquid is allowed to circulate through the first and second coupling members in the axis direction. The connection member connects the first coupling member to the second coupling member. The connection member has a cylindrical shape centered about the center axis and is mounted to the second coupling member so as to be rotatable about the center axis. One of the first coupling member and the connection member includes a connecting protrusion protruding in a radial direction, and the other of the first coupling member and the connection member has a connecting hole into which the connecting protrusion is insertable in the radial direction. The first coupling member is inserted into the connection member in the axis direction, and the connection member is rotated in one direction relative to the first coupling member, so that the connecting protrusion reaches such a position as to be engageable with the connecting hole in the axis direction, and thus a connected state is brought about where the first coupling member is connected to the second coupling member. The first and second coupling members each include a concavo-convex structure having irregularities in the axis direction. The concavo-convex structure is provided in each of parts of the first and second coupling members opposed to each other in the axis direction. The first coupling member is inserted into the connection member, and thus the respective concavo-convex structures of the first and second coupling members engage with each other in a circumferential direction. The concavo-convex structure includes a plurality of convexities arranged at a prescribed periodic angle in the circumferential direction. As viewed from the radial direction, the convexities each have a shape tapering down from a root toward a distal end thereof. The connection member has a guide groove. The guide groove is recessed from an inner circumferential surface of the connection member to a radial outer side thereof and extends in the axis direction from an end surface of the connection member on a connection side with the first coupling member to reach the connecting hole. When the first coupling member is inserted into or pulled out from inside the connection member, the connecting protrusion is fitted into the guide groove and passes through the guide groove in the axis direction. A rotation angle of the connection member by which the connection member is rotated from a state where the connecting protrusion fitted into the guide groove abuts on one side surface of the guide groove in the circumferential direction to a state where the connecting protrusion abuts on the other side surface of the guide groove in the circumferential direction is not less than ½ of the prescribed periodic angle.

An inkjet recording apparatus according to a second aspect of the present disclosure includes the above-described flow path connection mechanism and uses ink as the liquid to perform printing.

DETAILED DESCRIPTION

<Configuration of Inkjet Recording Apparatus>

Figure 1:
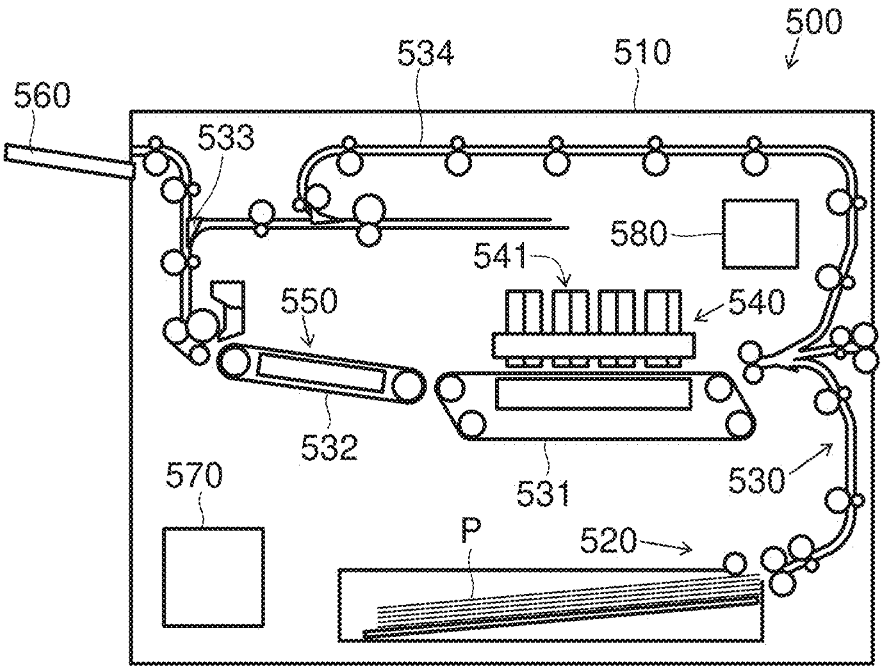
FIG. 1 is a schematic view of an inkjet recording apparatus according to one embodiment.

As shown in FIG. 1, an inkjet recording apparatus 500 according to a present embodiment is an inkjet recording type printer. The inkjet recording apparatus 500 includes an apparatus main body 510, a sheet feed unit 520, a sheet conveyance unit 530, a recording unit 540, a drying unit 550, a sheet discharge unit 560, and a control unit 570.

The sheet feed unit 520 contains sheets P as recording media. The sheet feed unit 520 feeds out the sheets P one by one. The sheet conveyance unit 530 conveys the sheet P fed out from the sheet feed unit 520. The sheet P passes through the recording unit 540 and the drying unit 550 in this order. In the recording unit 540, the sheet P is subjected to recording (in other words, image formation). In the drying unit 550, an image (namely, ink) recorded on the sheet P is dried. After that, the sheet conveyance unit 530 discharges the sheet P to the sheet discharge unit 560.

The sheet conveyance unit 530 includes a first belt conveyance portion 531 and a second belt conveyance portion 532. The first belt conveyance portion 531 and the second belt conveyance portion 532 each include an endless belt rotatably stretched therearound. The first belt conveyance portion 531 and the second belt conveyance portion 532 each hold the sheet P by suction on an outer circumferential surface of the belt. The belt rotates in this state to convey the sheet P.

In a case of performing duplex recording, the sheet conveyance unit 530 sorts the sheet P after being subjected to recording on one side thereof to an inversion conveyance portion 534 by means of a branch portion 533. The inversion conveyance portion 534 switches back the sheet P and conveys back the sheet P toward upstream of the recording unit 540 in a sheet conveyance direction. Thus, front and back sides of the sheet P are inverted. The sheet conveyance unit 530 conveys again the sheet P whose front and back sides have been inverted.

The recording unit 540 is positioned above the first belt conveyance portion 531 and is opposed at a prescribed distance to the sheet P being conveyed by the first belt conveyance portion 531 (specifically, the belt). The recording unit 540 includes line-type inkjet recording heads 541.

Figure 2:
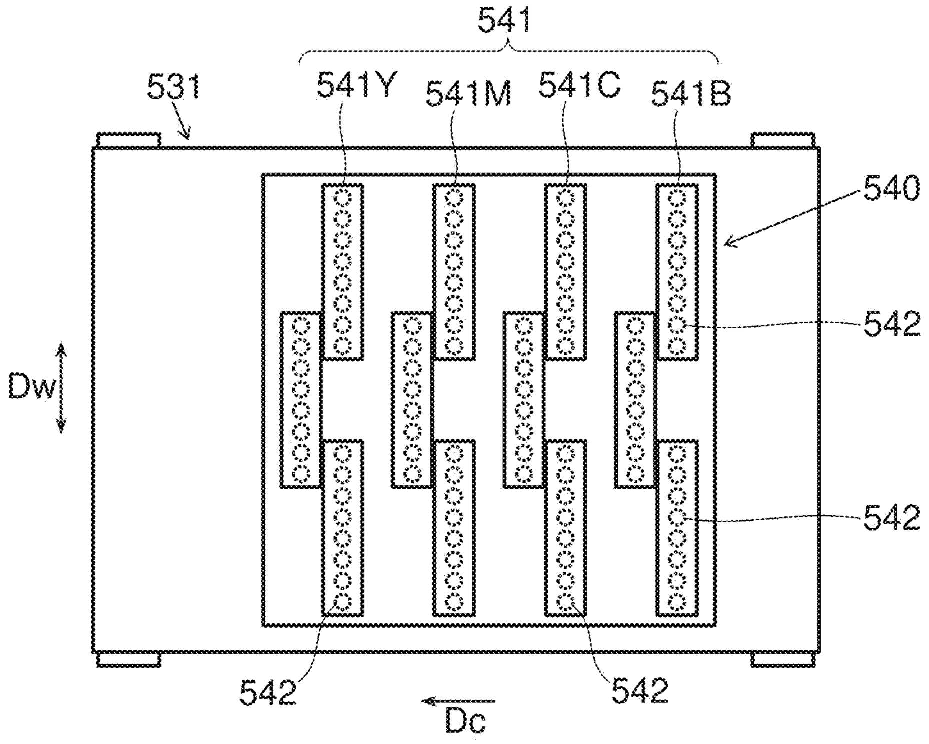
FIG. 2 is a plan view of a recording unit in the inkjet recording apparatus according to the one embodiment.

As shown in FIG. 2, the recording heads 541 include a plurality of (for example, three) recording heads as each of sets of recording heads 541B, 541C, 541M, and 541Y corresponding to four different colors of black, cyan, magenta, and yellow, respectively. The three recording heads 541 for each of the different colors are arranged in a staggered manner in a sheet width direction Dw orthogonal to a sheet conveyance direction Dc.

Each of the recording heads 541 has a plurality of ink ejection nozzles 542. The plurality of ink ejection nozzles 542 are arrayed in the sheet width direction Dw. The recording unit 540 ejects ink through the recording heads 541B, 541C, 541M, and 541Y toward the sheet P being conveyed by the first belt conveyance portion 531. Thus, an image is recorded on the sheet P.

Furthermore, as shown in FIG. 1, the drying unit 550 is arranged downstream of the recording unit 540 in the sheet conveyance direction. The second belt conveyance portion 532 conveys the sheet P in the drying unit 550. While the second belt conveyance portion 532 conveys the sheet P, the drying unit 550 dries ink adhering to the sheet P.

While not shown, the control unit 570 includes various types of electronic components such as processing circuits (for example, a CPU) and memories (for example, a ROM and a RAM). Based on control programs and control data, the control unit 570 controls operations of various constituent elements provided in the inkjet recording apparatus 500. The sheet feed unit 520, the sheet conveyance unit 530, the recording unit 540, and the drying unit 550 individually receive instructions from the control unit 570 and perform recording on the sheet P in coordination with each other.

The inkjet recording apparatus 500 also includes an ink supply unit 580. The ink supply unit 580 holds an ink container (not shown). The ink container contains ink. The ink supply unit 580 supplies the ink from the ink container to the apparatus main body 510. The ink is supplied to the recording unit 540. The recording heads 541 eject the ink supplied from the ink container.

Here, a tube TU (see FIG. 5) is used to supply the ink from the ink supply unit 580 to the apparatus main body 510. Via the tube TU, the ink is supplied from the ink supply unit 580 to the apparatus main body 510. In other words, the tube TU allows the ink to circulate therethrough.

The tube TU extends in such a manner as to be divided partway. An after-mentioned flow path connection mechanism 1000 (see FIGS. 3 to 5) is arranged at dividing positions on the tube TU. By linking together the dividing positions on the tube TU, the flow path connection mechanism 1000 allows the ink to circulate at the dividing positions on the tube TU. In this configuration, the ink corresponds to a "liquid."

<Configuration of Flow Path Connection Mechanism>

Figure 3:
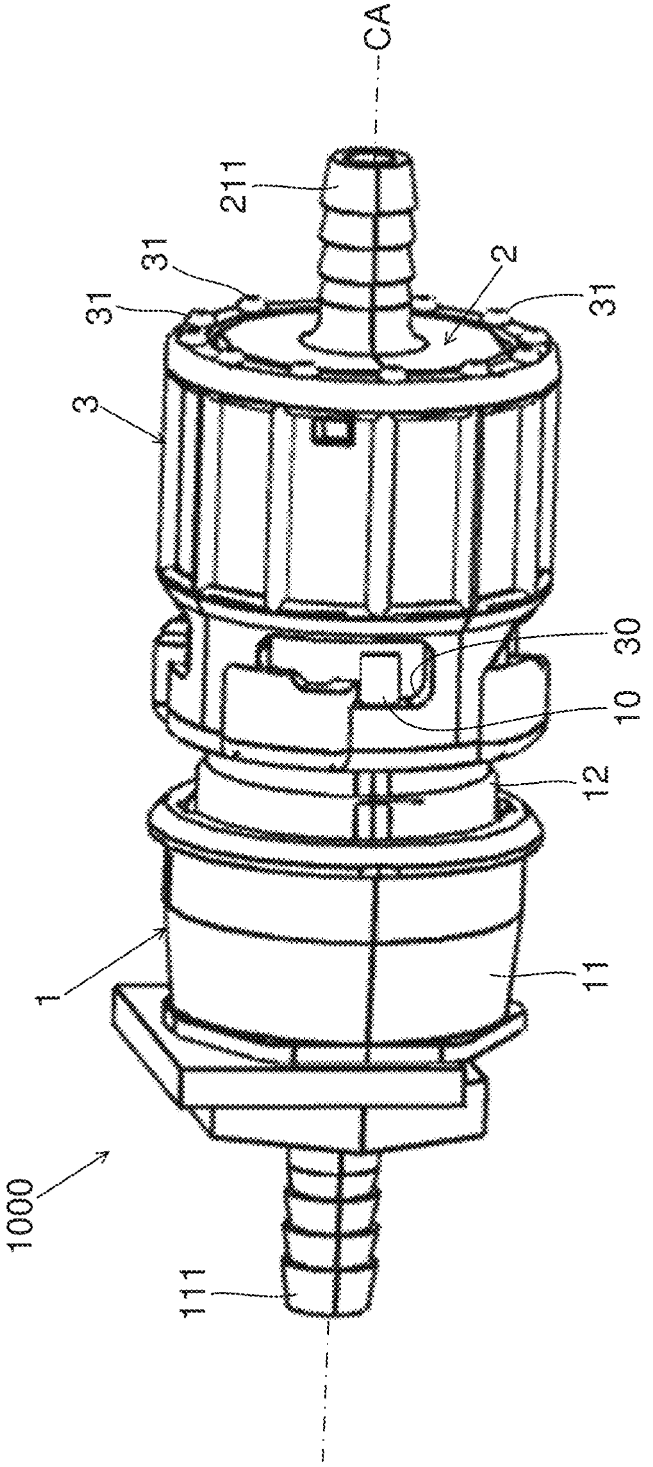
FIG. 3 is a perspective view of a flow path connection mechanism according to the one embodiment.
Figure 4:
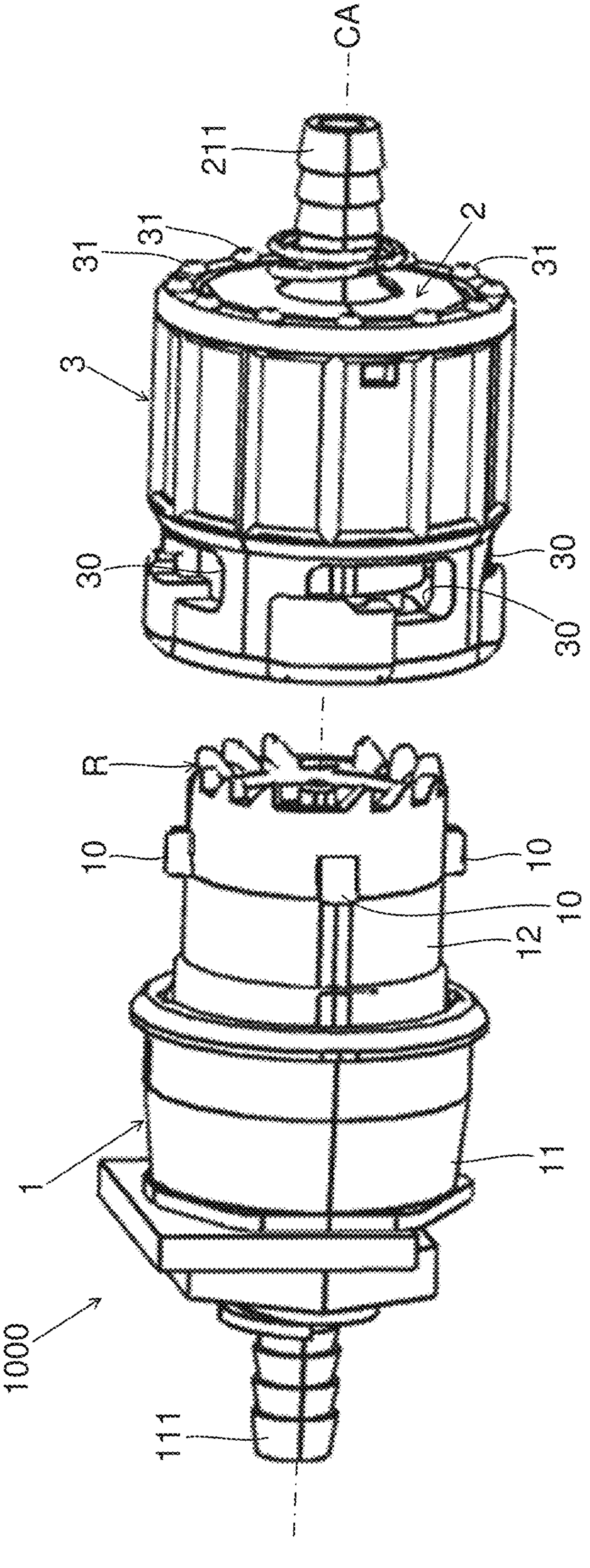
FIG. 4 is a perspective view of a state where a first coupling member is disconnected from a second coupling member according to the one embodiment.
Figure 5:
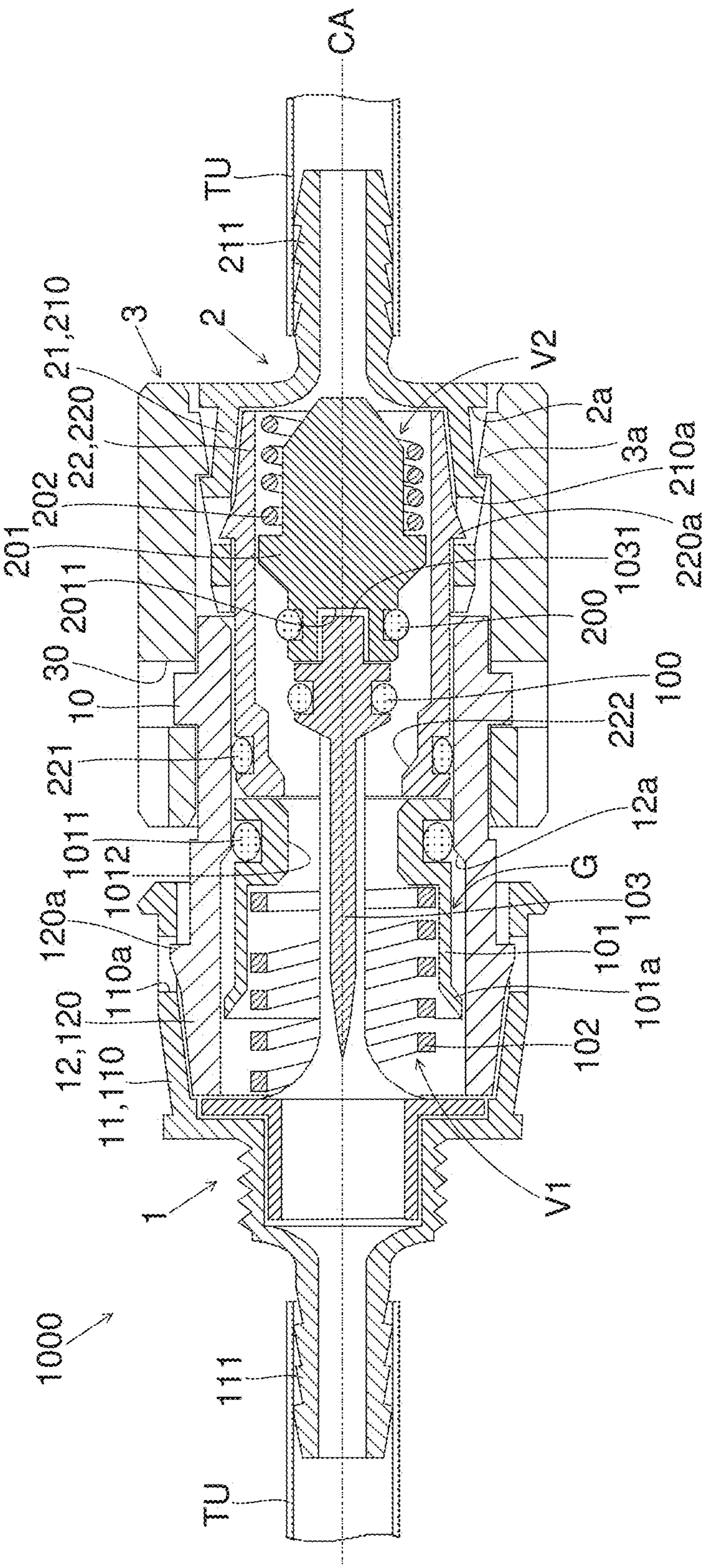
FIG. 5 is a sectional view of the flow path connection mechanism according to the one embodiment.

The inkjet recording apparatus 500 includes the flow path connection mechanism 1000 as shown in FIGS. 3 to 5. The flow path connection mechanism 1000 includes a first coupling member 1 and a second coupling member 2.

The first coupling member 1 and the second coupling member 2 are tubular bodies whose center axis CA is an axis extending in a prescribed direction. In the following description, an extending direction of the center axis CA (namely, a direction corresponding to the "prescribed direction") is referred to as an "axis direction," a circumferential direction about the center axis CA is referred to as a "circumferential direction," and a direction orthogonal to the center axis CA is referred to as a "radial direction." In the radial direction, one side directed toward the center axis CA is referred to as a "radial inner side," and the other side directed away from the center axis CA is referred to as a "radial outer side."

The first coupling member 1 and the second coupling member 2 are connected to the tube TU and include inside (i.e., inside the tubular bodies) ink circulation paths so as to allow ink circulation therethrough in the axis direction. That is, the first coupling member 1 and the second coupling member 2 are tubular bodies whose axis direction is an ink circulation direction.

The first coupling member 1 and the second coupling member 2 are connectable to each other in the axis direction. When the first coupling member 1 is connected to the second coupling member 2, the respective circulation paths of the first coupling member 1 and the second coupling member 2 communicate with each other in the axis direction so that ink can circulate therethrough in the axis direction. The first coupling member 1 is disconnectable from the second coupling member 2.

FIG. 3 shows a state where the first coupling member 1 is connected to the second coupling member 2. FIG. 4 shows a state where the first coupling member 1 is disconnected from the second coupling member 2. FIG. 5 is a sectional view of the state where the first coupling member 1 is connected to the second coupling member 2. A cross section shown in FIG. 5 corresponds to a cross section cut along a plane including the center axis CA.

<Configuration of First Coupling Member>

Figure 6:
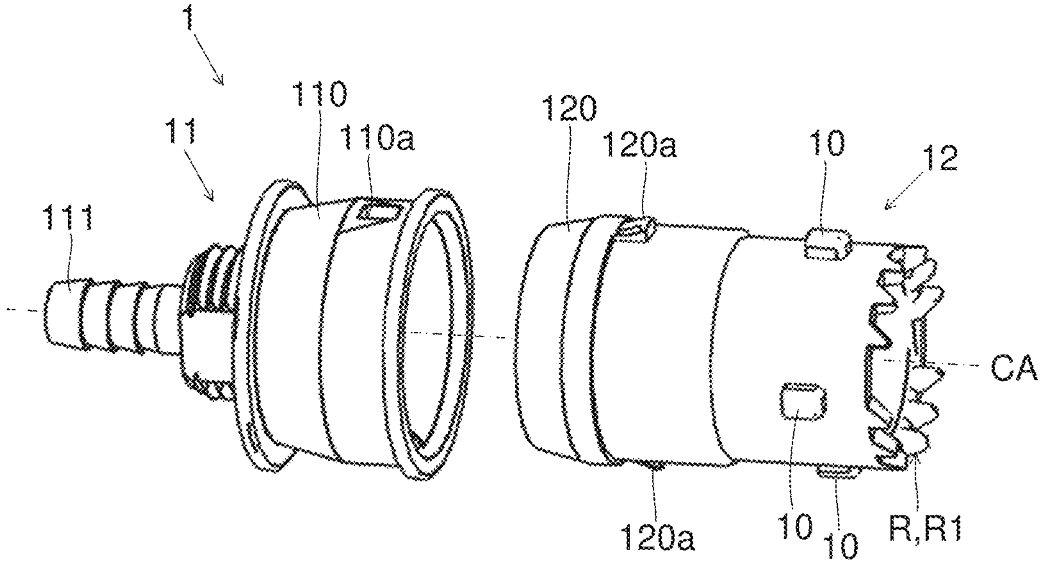
FIG. 6 is an exploded perspective view of the first coupling member according to the one embodiment.
Figure 7:
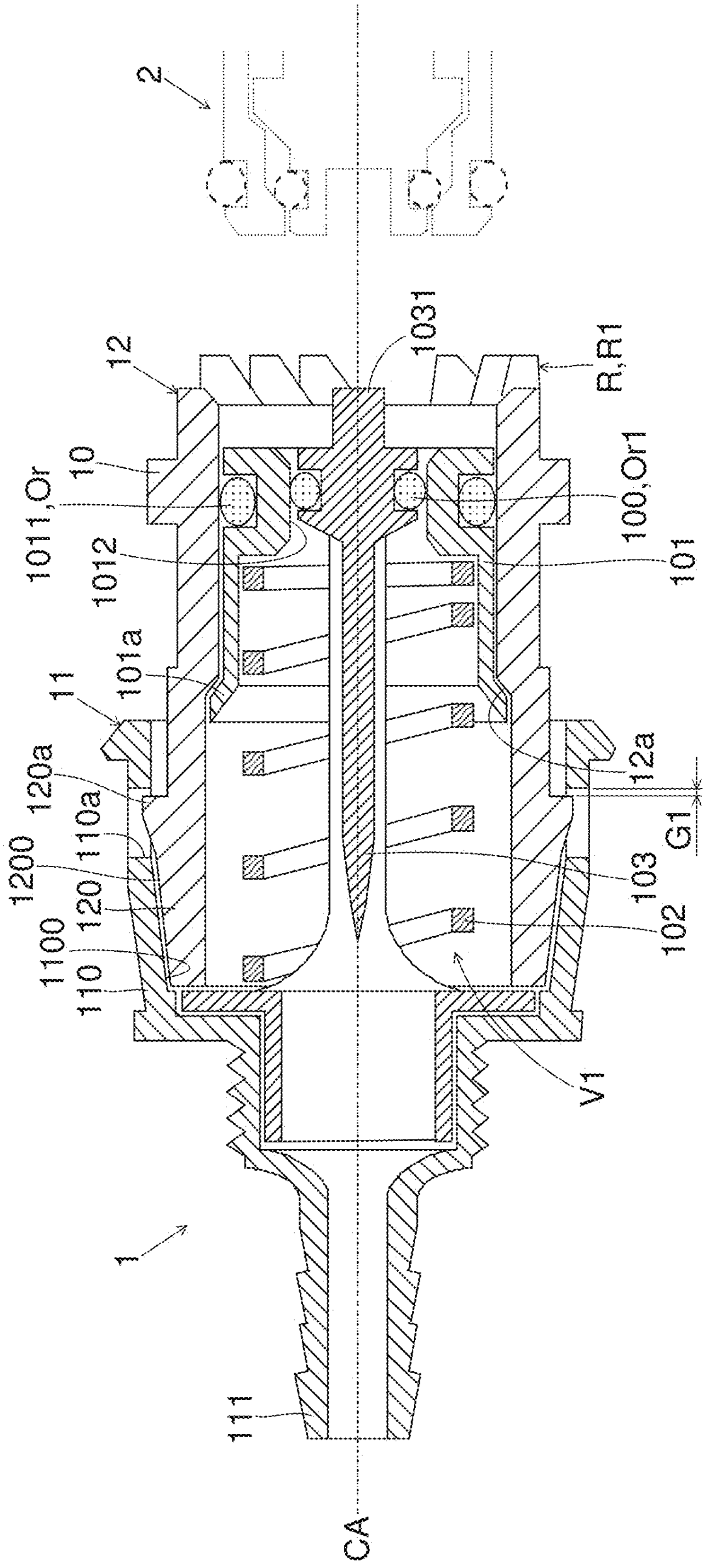
FIG. 7 is a sectional view of the first coupling member according to the one embodiment.

As shown in FIG. 6, the first coupling member 1 includes a first member 11 and a second member 12. The first member 11 and the second member 12 are secured to each other. When secured to each other, the first member 11 and the second member 12 are brought into a state of being connected to each other in the axis direction. FIG. 7 shows a sectional view of a state where the first member 11 and the second member 12 are secured to each other (a sectional view of the first coupling member 1 alone). A cross section shown in FIG. 7 corresponds to a cross section cut along the plane including the center axis CA.

The tube TU is connected to the first member 11. The second coupling member 2 (namely, another coupling member) is connected to the second member 12. In the following description, one of both sides of the first coupling member 1 in the axis direction to which the tube TU is connected is defined as one side of the first coupling member 1 in the axis direction, and the other side to which the second coupling member 2 is connected is defined as the other side of the first coupling member 1 in the axis direction. Inside the first coupling member 1, ink may circulate from the one side to the other side in the axis direction or from the other side to the one side in the axis direction.

The first member 11 includes a tube connection portion 111. The tube connection portion 111 has a cylindrical shape centered about the center axis CA. The tube connection portion 111 is arranged in a one-side part of the first member 11 in the axis direction. When the tube connection portion 111 is inserted into the tube TU, the tube TU is brought into a state of being connected to the first member 11.

Furthermore, the first member 11 includes an outer fitting portion 110. The outer fitting portion 110 is arranged in an other-side part of the first member 11 in the axis direction. The outer fitting portion 110 has a cylindrical shape centered about the center axis CA.

The second member 12 has a cylindrical shape centered about the center axis CA. Ink circulates inside the second member 12.

The second member 12 holds inside a first valve mechanism V1. That is, the first coupling member 1 includes the first valve mechanism V1 provided on a radial inner side thereof. The first valve mechanism V1 is arranged on a radial inner side of the second member 12. The first valve mechanism V1 includes a hollow movable valve 101, a compression coil spring 102, and a support 103. The hollow movable valve 101 and the support 103 are resin molded articles. The compression coil spring 102 corresponds to a "biasing member."

The first valve mechanism V1 includes a first valve housing. The second member 12 corresponds to the "first valve housing." That is, the first valve housing has a cylindrical shape centered about the center axis CA.

The hollow movable valve 101 is arranged on the radial inner side of the second member 12. The hollow movable valve 101 has a cylindrical shape centered about the center axis CA. Inside the hollow movable valve 101, ink circulates in the axis direction. That is, ink circulates inside the second member 12.

The hollow movable valve 101 includes a sealing portion 1011 provided on an outer circumferential surface thereof. A sealing member Or is arranged in the sealing portion 1011. The sealing member Or in the sealing portion 1011 is an O-ring formed of an elastic body such as rubber. The sealing member Or is fitted to the outer circumferential surface of the hollow movable valve 101, and thus the sealing portion 1011 is formed. An outer circumferential part of the sealing member Or in the sealing portion 1011 intimately contacts an inner circumferential surface of the second member 12. Thus, on a radial outer side of the hollow movable valve 101, ink circulation in the axis direction is restricted.

The compression coil spring 102 is arranged on the radial inner side of the second member 12. The compression coil spring 102 generates a biasing force in the axis direction. Thus, the compression coil spring 102 biases the hollow movable valve 101 toward the other side in the axis direction. In other words, the compression coil spring 102 biases the hollow movable valve 101 toward a connection side with the second coupling member 2.

However, in a disconnected state where the first coupling member 1 is disconnected from the second coupling member 2 (a state shown in FIG. 7), movement of the hollow movable valve 101 to the other side in the axis direction is restricted. The hollow movable valve 101 is, therefore, prevented from falling off from the radial inner side of the second member 12 to outside the second member 12.

The compression coil spring 102 biases the first member 11 toward the one side in the axis direction. That is, the compression coil spring 102 biases the first member 11 in a direction away from the second member 12. However, the first member 11 and the second member 12 are secured to each other. The first member 11 is, therefore, prevented from coming off from the second member 12.

The support 103 extends in the axis direction. On the radial inner side of the second member 12, the support 103 is arranged to penetrate through the hollow movable valve 101 in the axis direction. That is, the support 103 is arranged on a radial inner side of the hollow movable valve 101. Furthermore, on the radial inner side of the second member 12, the support 103 penetrates through the compression coil spring 102 in the axis direction. The support 103 is configured not to be displaced relative to the second member 12 in the axis direction.

The support 103 includes a first sealing portion 100 provided on an outer circumferential surface thereof. That is, the first coupling member 1 includes the first sealing portion 100 provided on the radial inner side thereof. The first sealing portion 100 is a part of the support 103 to which a loop-shaped sealing member Or is attached. In the following description, the sealing member Or attached to the support 103 is referred to as a first scaling member Or1. The support 103 has a first sealing groove (not assigned a reference sign) extending endlessly and continuously in the circumferential direction. Further, the first sealing member Or1 is arranged in the first sealing groove.

The first sealing member Or1 is an O-ring formed of an elastic body such as rubber. The first sealing member Or1 is fitted to the outer circumferential surface of the support 103, and thus the first sealing portion 100 is formed. An outer circumferential part of the first sealing member Or1 is intimately contactable with an inner circumferential surface of the hollow movable valve 101. In other words, the first sealing portion 100 is intimately contactable with the inner circumferential surface of the hollow movable valve 101 (specifically, an after-mentioned first protrusion 1012).

The first sealing portion 100 intimately contacts the inner circumferential surface of the hollow movable valve 101 and thus restricts ink circulation inside the second member 12. That is, the first sealing portion 100 restricts ink circulation inside the first coupling member 1.

The hollow movable valve 101 includes, as a part thereof to intimately contact the first sealing portion 100, the first protrusion 1012 provided on the inner circumferential surface thereof and protruding toward the radial inner side. The first protrusion 1012 extends in a continuous loop in the circumferential direction. That is, the first protrusion 1012 is a protrusion extending endlessly in the circumferential direction. The first protrusion 1012 is a part of the hollow movable valve 101 where the hollow movable valve 101 has an inner diameter smaller than at any other parts thereof.

Furthermore, the second member 12 includes an inner fitting portion 120. The inner fitting portion 120 is arranged in a one-side part of the second member 12 in the axis direction. Specifically, a one-side part of a cylindrical tubular body as the second member 12 in the axis direction constitutes the inner fitting portion 120.

The outer fitting portion 110 of the first member 11 and the inner fitting portion 120 of the second member 12 are fitted to each other. Specifically, the inner fitting portion 120 is internally fitted to the outer fitting portion 110. In other words, the inner fitting portion 120 is inserted into the outer fitting portion 110. In this state, an inner circumferential surface 1100 of the outer fitting portion 110 and an outer circumferential surface 1200 of the inner fitting portion 120 at least partly contact each other.

The first member 11 and the second member 12 are secured to each other in a state where the outer fitting portion 110 and the inner fitting portion 120 are fitted to each other. A laser welding method is used to secure the first member 11 to the second member 12. Specifically, in the state where the outer fitting portion 110 and the inner fitting portion 120 are fitted to each other, a laser is applied from a radial outer side of the outer fitting portion 110 to a fitted area between the outer fitting portion 110 and the inner fitting portion 120. Thus, at an interface between the outer fitting portion 110 and the inner fitting portion 120, a resin forming the outer fitting portion 110 and a resin forming the inner fitting portion 120 are welded to each other. That is, the first member 11 and the second member 12 are fastened to each other at a fitted area therebetween.

In the first coupling member 1 according to this embodiment, in order to accurately secure the first member 11 to the second member 12, the inner circumferential surface 1100 of the outer fitting portion 110 and the outer circumferential surface 1200 of the inner fitting portion 120 are each so tapered as to increase in distance from the center axis CA from the one side toward the other side in the axis direction. That is, the outer fitting portion 110 has an inner diameter gradually increasing from the one side toward the other side in the axis direction. The inner fitting portion 120 has an outer diameter gradually increasing from the one side toward the other side in the axis direction.

In this configuration, a clearance between the inner circumferential surface 1100 of the outer fitting portion 110 and the outer circumferential surface 1200 of the inner fitting portion 120 in the radial direction can be minimized. With the clearance reduced, rattling between the first member 11 and the second member 12 is suppressed. Also, coaxiality between the first member 11 and the second member 12 is enhanced. Accordingly, it is possible to accurately secure the first member 11 to the second member 12. As a result, it is possible to suppress ink leakage from a connected area between the first member 11 and the second member 12. That is, it is possible to suppress liquid leakage in the first coupling member 1.

The clearance between the inner circumferential surface 1100 of the outer fitting portion 110 and the outer circumferential surface 1200 of the inner fitting portion 120 in the radial direction (hereinafter, referred to simply as a clearance) is set to not more than 0.1 mm. Thus, it is possible to more accurately secure the first member 11 to the second member 12.

Here, in a configuration in which the inner fitting portion 120 is internally fitted to the outer fitting portion 110, it is required that various relevant members be dimensionally set so that the outer fitting portion 110 has an inner diameter larger than an outer diameter of the inner fitting portion 120.

In an assumed configuration in which only one or neither of the inner circumferential surface 1100 of the outer fitting portion 110 and the outer circumferential surface 1200 of the inner fitting portion 120 is tapered, when the clearance is too small, it becomes difficult for the inner fitting portion 120 to be internally fitted to the outer fitting portion 110. The various relevant members are, therefore, dimensionally set in consideration of fitting workability in a case where the inner diameter of the outer fitting portion 110 has a minimum value in its range of tolerance and the outer diameter of the inner fitting portion 120 has a maximum value in its range of tolerance. For example, with a tolerance of 0.03 mm, the inner diameter of the outer fitting portion 110 is set to 10.04 mm, and the outer diameter of the inner fitting portion 120 is set to 9.96 mm. In this case, a maximum value of the inner diameter of the outer fitting portion 110 is 10.07 mm, and a minimum value of the outer diameter of the inner fitting portion 120 is 9.93 mm, so that the clearance has a maximum value of 0.14 mm.

On the other hand, in a configuration (this embodiment) in which the inner circumferential surface 1100 of the outer fitting portion 110 and the outer circumferential surface 1200 of the inner fitting portion 120 are each tapered, even when the clearance is small, it is possible to suppress a case where it becomes difficult for the inner fitting portion 120 to be internally fitted to the outer fitting portion 110. With this in view, for example, with a tolerance of 0.03 mm, the inner diameter of the outer fitting portion 110 is set to 10.01 mm, and the outer diameter of the inner fitting portion 120 is set to 9.98 mm. In this case, the maximum value of the inner diameter of the outer fitting portion 110 is 10.04 mm, and the minimum value of the outer diameter of the inner fitting portion 120 is 9.95 mm, so that the clearance has a maximum value of 0.09 mm (namely, not more than 0.1 mm).

Furthermore, in the first coupling member 1 according to this embodiment, the outer fitting portion 110 has a light absorption rate lower than that of the inner fitting portion 120. The outer fitting portion 110 is a part of the first member 11, and the inner fitting portion 120 is a part of the second member 12. That is, respective constituent materials of the first member 11 and the second member 12 are different from each other in light absorption rate.

Since the outer fitting portion 110 has a light absorption rate lower than that of the inner fitting portion 120, when a laser is applied from the radial outer side of the outer fitting portion 110, the laser efficiently passes through the outer fitting portion 110 to be absorbed by the inner fitting portion 120. Thus, the first member 11 can be secured to the second member 12 by laser welding. As a result, while the first member 11 and the second member 12 are members separate from each other, there can be easily obtained the first coupling member 1 composed of the first member 11 and the second member 12.

In a case of using the laser welding method, compared with a case where a coinjection molding method is used to manufacture the first coupling member 1 composed of the first member 11 and the second member 12, it is possible to reduce a manufacturing cost of the first coupling member 1 (i.e., it is possible to reduce a component cost). Moreover, in the case of using the laser welding method, there is no need to use an adhesive to secure the first member 11 to the second member 12, and thus reliability is prevented from being impaired due to unevenness in applying the adhesive, deterioration of the adhesive, and so on.

Furthermore, in the first coupling member 1 according to this embodiment, the outer fitting portion 110 has an engagement hole 110*a* penetrating through the outer fitting portion 110 in the radial direction. The inner fitting portion 120 includes an engagement projection 120*a* protruding from the inner fitting portion 120 to a radial outer side thereof.

The engagement hole 110*a* and the engagement projection 120*a* are engageable with each other. When the engagement projection 120*a* is inserted into the engagement hole 110*a*, the engagement hole 110*a* and the engagement projection 120*a* engage with each other. The outer fitting portion 110 has a plurality of engagement holes 110*a* arranged at positions point-symmetrical about the center axis CA. The inner fitting portion 120 includes a plurality of engagement projections 120*a* to be inserted into and thus engaged with the plurality of engagement holes 110*a*. That is, the inner fitting portion 120 includes a plurality of engagement projections 120*a* arranged at positions point-symmetrical about the center axis CA.

In a configuration in which the outer fitting portion 110 has the engagement hole 110*a* and the inner fitting portion 120 includes the engagement projection 120*a*, when the outer fitting portion 110 is secured to the inner fitting portion 120 by the laser welding, the engagement hole 110*a* is engaged beforehand with the engagement projection 120*a*, and thus it is possible to temporarily join the first member 11 to the second member 12. This improves workability in a laser welding process.

Furthermore, when the engagement projection 120*a* is engaged with the engagement hole 110*a* so that the first member 11 is temporarily joined to the second member 12, the outer fitting portion 110 as a whole is elastically deformed (specifically, deformed into an elliptical shape), and thus the engagement projection 120*a* can be easily engaged with the engagement hole 110*a*. As a result, it is possible with ease to temporarily join the first member 11 to the second member 12 without causing damage to the outer fitting portion 110 and the inner fitting portion 120.

After the first member 11 has been secured to the second member 12 by the laser welding, due to maintained engagement of the engagement projection 120*a* with the engagement hole 110*a*, it becomes likely that stress is generated at an engaged area between the engagement hole 110*a* and the engagement projection 120*a*, causing damage to and around the engaged area between the engagement hole 110*a* and the engagement projection 120*a*.

To address this issue, in the first coupling member 1 according to this embodiment, in a state where the first member 11 is secured to the second member 12, a gap G1 (see FIG. 7) is provided between the engagement hole 110*a* and the engagement projection 120*a* in the axis direction. Thus, it is possible to suppress generation of stress at the engaged area between the engagement hole 110*a* and the engagement projection 120*a*.

<Configuration of Second Coupling Member>

Figure 8:
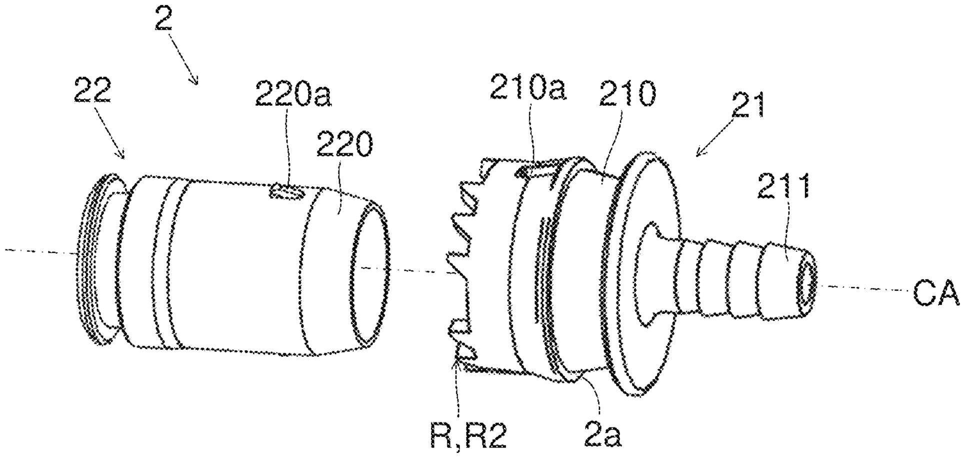
FIG. 8 is an exploded perspective view of the second coupling member according to the one embodiment.
Figure 9:
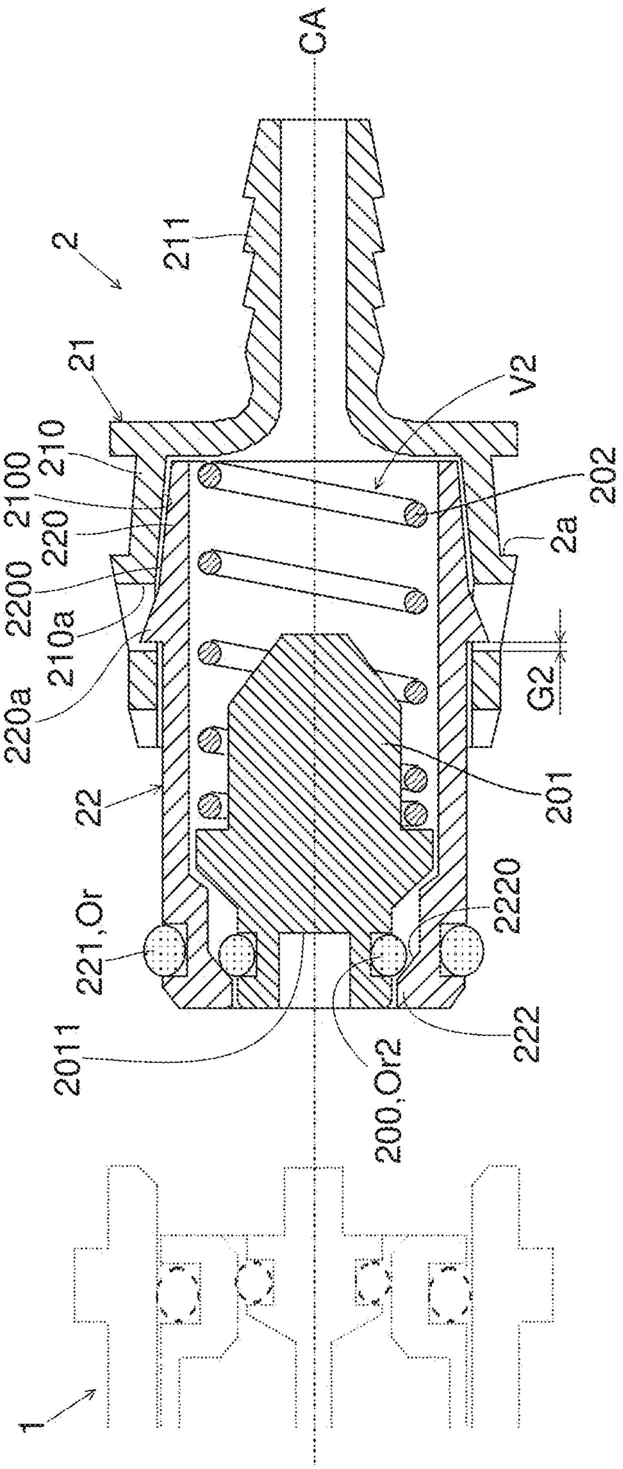
FIG. 9 is a sectional view of the second coupling member according to the one embodiment.

As shown in FIG. 8, the second coupling member 2 includes a first member 21 and a second member 22. The first member 21 and the second member 22 are secured to each other. When secured to each other, the first member 21 and the second member 22 are brought into a state of being connected to each other in the axis direction. FIG. 9 shows a sectional view of a state where the first member 21 and the second member 22 are secured to each other (a sectional view of the second coupling member 2 alone). A cross section shown in FIG. 9 corresponds to a cross section cut along the plane including the center axis CA.

The tube TU is connected to the first member 21. The first coupling member 1 (namely, another coupling member) is connected to the second member 22. In the following description, one of both sides of the second coupling member 2 in the axis direction to which the tube TU is connected is defined as one side of the second coupling member 2 in the axis direction, and the other side to which the first coupling member 1 is connected is defined as the other side of the second coupling member 2 in the axis direction. Inside the second coupling member 2, ink may circulate from the one side to the other side in the axis direction or from the other side to the one side in the axis direction.

The first member 21 includes a tube connection portion 211. The tube connection portion 211 has a cylindrical shape centered about the center axis CA. The tube connection portion 211 is arranged in a one-side part of the first member 21 in the axis direction. When the tube connection portion 211 is inserted into the tube TU, the tube TU is brought into a state of being connected to the first member 21.

Furthermore, the first member 21 includes an outer fitting portion 210. The outer fitting portion 210 is arranged in an other-side part of the first member 21 in the axis direction. The outer fitting portion 210 has a cylindrical shape centered about the center axis CA.

The second member 22 has a cylindrical shape centered about the center axis CA. Ink circulates inside the second member 22.

The second member 22 includes a sealing portion 221 provided on an outer circumferential surface thereof. A scaling member Or is arranged in the sealing portion 221. The scaling member Or in the sealing portion 221 is an O-ring formed of an elastic body such as rubber. The scaling member Or is fitted to the outer circumferential surface of the second member 22, and thus the sealing portion 221 is formed.

In a connected state where the first coupling member 1 is connected to the second coupling member 2 (a state shown in FIGS. 3 and 5), the second member 22 of the second coupling member 2 is internally fitted to the second member 12 of the first coupling member 1. In this state, an outer circumferential part of the sealing member Or in the sealing portion 221 of the second coupling member 2 intimately contacts the inner circumferential surface of the second member 12 of the first coupling member 1. Thus, in a state where the second member 22 of the second coupling member 2 is internally fitted to the second member 12 of the first coupling member 1 (namely, the connected state), on a radial outer side of the second member 22 of the second coupling member 2, ink circulation in the axis direction is restricted.

The second member 22 holds inside a second valve mechanism V2. That is, the second coupling member 2 includes the second valve mechanism V2 provided on a radial inner side thereof. The second valve mechanism V2 is arranged on a radial inner side of the second member 22. The second valve mechanism V2 includes a movable valve 201 and a compression coil spring 202. The movable valve 201 is a resin molded article. The compression coil spring 202 corresponds to a "biasing member."

The second valve mechanism V2 includes a second valve housing. The second member 22 corresponds to the "second valve housing." That is, the second valve housing has a cylindrical shape centered about the center axis CA.

The movable valve 201 is arranged on the radial inner side of the second member 22. The movable valve 201 has a cylindrical columnar shape centered about the center axis CA. Between the second member 22 and the movable valve 201 in the radial direction, ink circulates in the axis direction. That is, ink circulates inside the second member 22.

The movable valve 201 includes a second sealing portion 200 provided on an outer circumferential surface thereof. That is, the second coupling member 2 includes the second sealing portion 200 provided on the radial inner side thereof. The second sealing portion 200 is a part of the movable valve 201 to which a loop-shaped sealing member Or is attached. In the following description, the sealing member Or attached to the movable valve 201 is referred to as a second sealing member Or2. The movable valve 201 has a second sealing groove (not assigned a reference sign) extending endlessly and continuously in the circumferential direction. Further, the second sealing member Or2 is arranged in the second sealing groove.

The second sealing member Or2 is an O-ring formed of an elastic body such as rubber. The second sealing member Or2 is fitted to the outer circumferential surface of the movable valve 201, and thus the second sealing portion 200 is formed. An outer circumferential part of the second sealing member Or2 is intimately contactable with an inner circumferential surface of the second member 22. In other words, the second sealing portion 200 is intimately contactable with the inner circumferential surface of the second member 22 (specifically, an inclined surface 2220 of an after-mentioned second protrusion 222).

The second sealing portion 200 intimately contacts the inner circumferential surface of the second member 22 and thus restricts ink circulation inside the second member 22. That is, the second sealing portion 200 restricts ink circulation inside the second coupling member 2.

The second member 22 includes, as a part thereof to intimately contact the second sealing portion 200, the second protrusion 222 provided on the inner circumferential surface thereof and protruding toward the radial inner side. The second protrusion 222 extends in a continuous loop in the circumferential direction. That is, the second protrusion 222 is a protrusion extending endlessly in the circumferential direction. The second protrusion 222 is a part of the second member 22 where the second member 22 has an inner diameter smaller than at any other parts thereof.

The compression coil spring 202 is arranged on the radial inner side of the second member 22. The compression coil spring 202 generates a biasing force in the axis direction. Thus, the compression coil spring 202 biases the movable valve 201 toward the other side in the axis direction. In other words, the compression coil spring 202 biases the movable valve 201 toward a connection side with the first coupling member 1.

However, in the disconnected state where the first coupling member 1 is disconnected from the second coupling member 2 (a state shown in FIG. 9), movement of the movable valve 201 to the other side in the axis direction is restricted. The movable valve 201 is, therefore, prevented from falling off from the radial inner side of the second member 22 to outside the second member 22.

The compression coil spring 202 biases the first member 21 toward the one side in the axis direction. That is, the compression coil spring 202 biases the first member 21 in a direction away from the second member 22. However, the first member 21 and the second member 22 are secured to each other. The first member 21 is, therefore, prevented from coming off from the second member 22.

Furthermore, the second member 22 includes an inner fitting portion 220. The inner fitting portion 220 is arranged in a one-side part of the second member 22 in the axis direction. Specifically, a one-side part of a cylindrical tubular body as the second member 22 in the axis direction constitutes the inner fitting portion 220.

The outer fitting portion 210 of the first member 21 and the inner fitting portion 220 of the second member 22 are fitted to each other. Specifically, the inner fitting portion 220 is internally fitted to the outer fitting portion 210. In other words, the inner fitting portion 220 is inserted into the outer fitting portion 210. In this state, an inner circumferential surface 2100 of the outer fitting portion 210 and an outer circumferential surface 2200 of the inner fitting portion 220 at least partly contact each other.

The first member 21 and the second member 22 are secured to each other in a state where the outer fitting portion 210 and the inner fitting portion 220 are fitted to each other. The laser welding method is used to secure the first member 21 to the second member 22. Specifically, in the state where the outer fitting portion 210 and the inner fitting portion 220 are fitted to each other, a laser is applied from a radial outer side of the outer fitting portion 210 to a fitted area between the outer fitting portion 210 and the inner fitting portion 220. Thus, at an interface between the outer fitting portion 210 and the inner fitting portion 220, a resin forming the outer fitting portion 210 and a resin forming the inner fitting portion 220 are welded to each other. That is, the first member 21 and the second member 22 are fastened to each other at a fitted area therebetween.

In the second coupling member 2 according to this embodiment, similarly to the first coupling member 1, in order to accurately secure the first member 21 to the second member 22, the inner circumferential surface 2100 of the outer fitting portion 210 and the outer circumferential surface 2200 of the inner fitting portion 220 are each so tapered as to increase in distance from the center axis CA from the one side toward the other side in the axis direction. That is, the outer fitting portion 210 has an inner diameter gradually increasing from the one side toward the other side in the axis direction. The inner fitting portion 220 has an outer diameter gradually increasing from the one side toward the other side in the axis direction.

In this configuration, rattling between the first member 21 and the second member 22 is suppressed, and coaxiality between the first member 21 and the second member 22 is enhanced, so that it is possible to accurately secure the first member 21 to the second member 22. As a result, it is possible to suppress liquid leakage also in the second coupling member 2.

Furthermore, in the second coupling member 2 according to this embodiment, a clearance between the inner circumferential surface 2100 of the outer fitting portion 210 and the outer circumferential surface 2200 of the inner fitting portion 220 in the radial direction is set to not more than 0.1 mm.

Furthermore, in the second coupling member 2 according to this embodiment, the outer fitting portion 210 has a light absorption rate lower than that of the inner fitting portion 220.

Furthermore, in the second coupling member 2 according to this embodiment, the outer fitting portion 210 has an engagement hole 210*a* penetrating through the outer fitting portion 210 in the radial direction. The inner fitting portion 220 includes an engagement projection 220*a* protruding from the inner fitting portion 220 to a radial outer side thereof. The outer fitting portion 210 has a plurality of engagement holes 210*a* arranged at positions point-symmetrical about the center axis CA. The inner fitting portion 220 includes a plurality of engagement projections 220*a* to be inserted into and thus engaged with the plurality of engagement holes 210*a*.

Accordingly, a manufacturing process of the second coupling member 2 also provides effects similar to those provided by a manufacturing process of the first coupling member 1. That is, it is possible to improve workability in the laser welding process.

Furthermore, when the engagement projection 220*a* is engaged with the engagement hole 210*a* so that the first member 21 is temporarily joined to the second member 22, it is possible to suppress damage to at least one of the outer fitting portion 210 and the inner fitting portion 220.

Furthermore, in the second coupling member 2 according to this embodiment, in a state where the first member 21 is secured to the second member 22, a gap G2 (see FIG. 9) is provided between the engagement hole 210*a* and the engagement projection 220*a* in the axis direction. Thus, it is possible to suppress generation of stress at an engaged area between the engagement hole 210*a* and the engagement projection 220*a*.

<Connection Structure Between First Coupling Member and Second Coupling Member>

Figure 10:
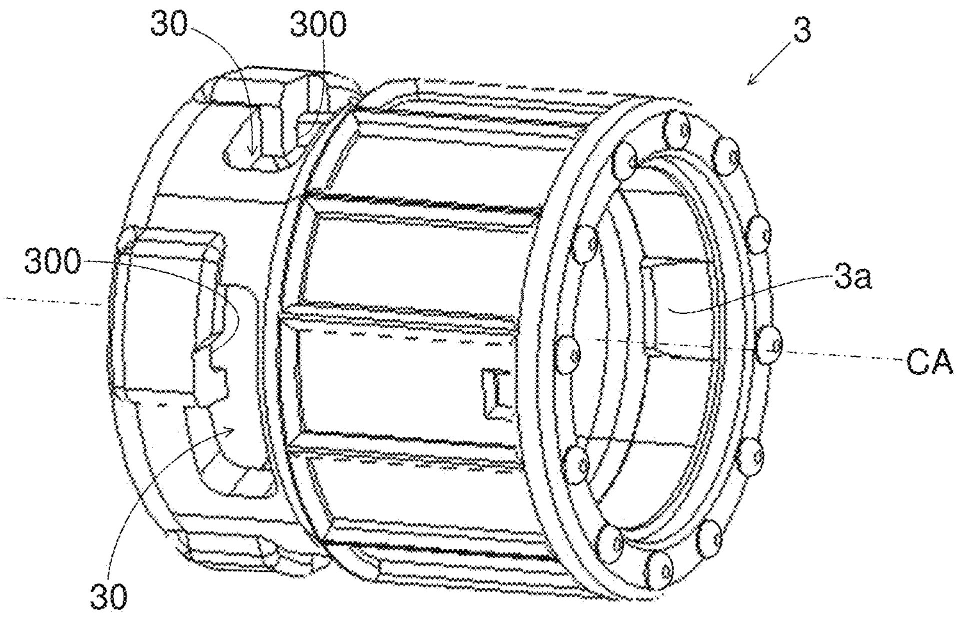
FIG. 10 is a perspective view of a connection member according to the one embodiment.

The flow path connection mechanism 1000 includes a connection member 3 as shown in FIG. 10. The connection member 3 is used to connect the first coupling member 1 to the second coupling member 2. The connection member 3 is mounted to the second coupling member 2. The connection member 3 may be configured as one constituent element of the second coupling member 2. In a state where the connection member 3 is mounted to the second coupling member 2, the first coupling member 1 is connected to the second coupling member 2.

The connection member 3 has a cylindrical shape centered about the center axis CA. The connection member 3 is arranged so that an inner circumferential surface thereof is opposed to an outer circumferential surface of the second coupling member 2 in the radial direction. That is, the second coupling member 2 is covered with the connection member 3 from a radial outer side thereof.

In a state of being mounted to the second coupling member 2, the connection member 3 is rotatable about the center axis CA. In the disconnected state where the first coupling member 1 is disconnected from the second coupling member 2 (a state shown in FIG. 4), the connection member 3 can be freely rotated by a manual operation.

In order to rotatably mount the connection member 3 to the second coupling member 2, the connection member 3 includes a plurality of projections 3*a* arranged on the inner circumferential surface thereof at a distance from each other in the circumferential direction. The plurality of projections 3*a* protrude from the inner circumferential surface of the connection member 3 to a radial inner side thereof.

The second coupling member 2 has a groove 2*a* extending endlessly and continuously in the circumferential direction. The groove 2*a* is formed in an outer circumferential surface of the first member 21. That is, the first member 21 has the groove 2*a* provided in the outer circumferential surface thereof.

The projections 3*a* of the connection member 3 are fitted into the groove 2*a* of the second coupling member 2. This restricts movement of the connection member 3 relative to the second coupling member 2 in the axis direction. That is, it is possible to suppress a phenomenon in which the connection member 3 moves relative to the second coupling member 2 in the axis direction and comes off from the second coupling member 2.

In a case where the connection member 3 is displaced in the circumferential direction, the projections 3*a* move in the circumferential direction along the groove 2*a*. At this time, the projections 3*a* move in the circumferential direction while being guided by the groove 2*a*. Thus, the connection member 3 rotates about the center axis CA.

The first coupling member 1 includes a connecting protrusion 10 (see FIG. 11) protruding to a radial outer side thereof. The connecting protrusion 10 protrudes from an outer circumferential surface of the first coupling member 1 to the radial outer side thereof. The connecting protrusion 10 protrudes from an outer circumferential surface of the second member 12 to a radial outer side thereof. A plurality of connecting protrusions 10 are provided. The plurality of connecting protrusions 10 are arranged at a distance from each other in the circumferential direction.

The connection member 3 has a connecting hole 30 penetrating therethrough in the radial direction. The connecting hole 30 is a hole into which the connecting protrusion 10 is insertable in the radial direction. In other words, the connecting hole 30 is a hole engageable with the connecting protrusion 10. A plurality of connecting holes 30 are provided, and the number of connecting holes 30 provided is equal to the number of connecting protrusions 10 provided. The connecting holes 30 are allotted in one-to-one correspondence to the plurality of connecting protrusions 10. Each of the plurality of connecting protrusions 10 is fitted into a corresponding one of the connecting holes 30. Each of the plurality of connecting protrusions 10 engages with a corresponding one of the connecting holes 30. This brings about the connected state where the first coupling member 1 is connected to the second coupling member 2.

Figure 11:
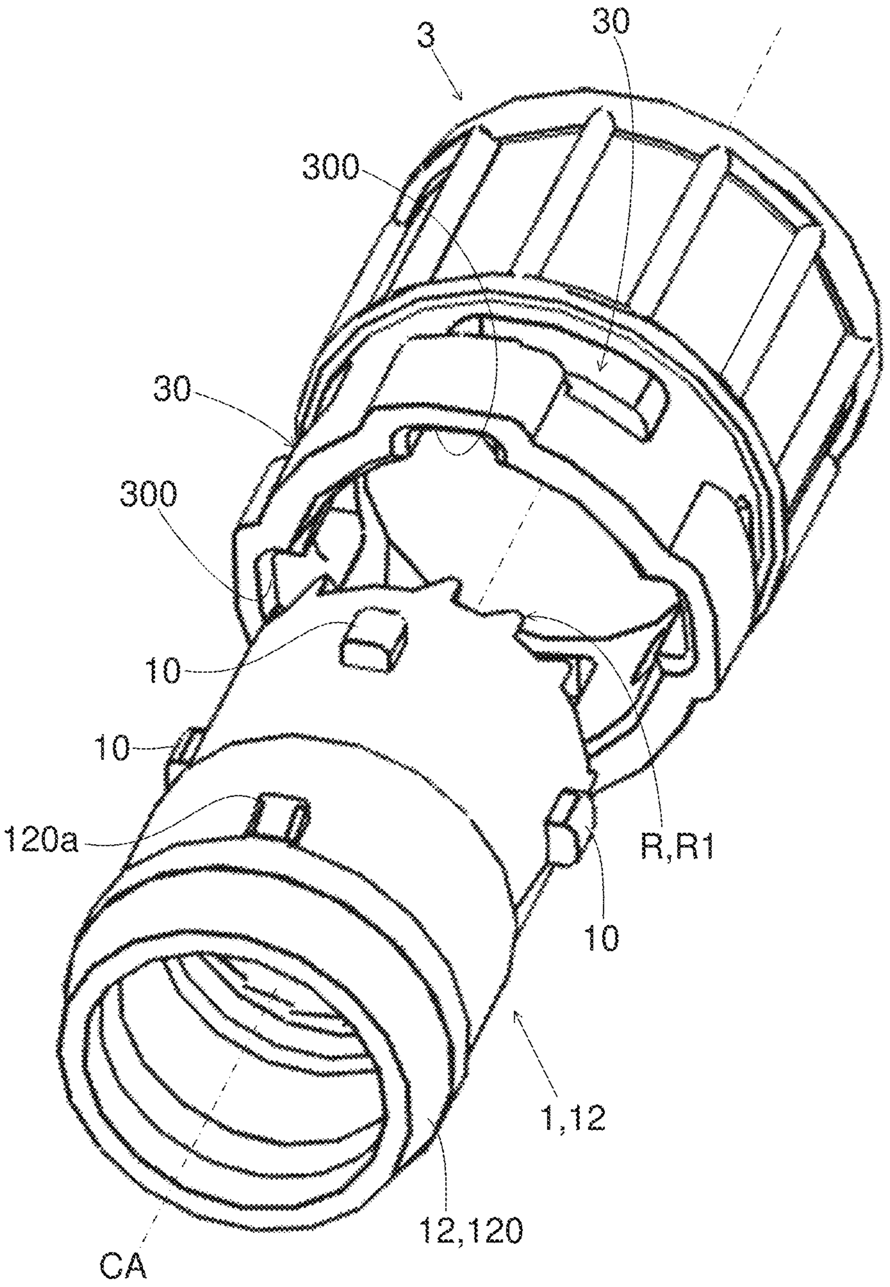
FIG. 11 is a perspective view showing a positional relationship between a connecting protrusion and a guide groove at a time when the first coupling member is inserted into the connection member according to the one embodiment.

The first coupling member 1 (namely, the second member 12) is inserted into the connection member 3 in the axis direction. When the first coupling member 1 is inserted into the connection member 3, the connecting protrusion 10 can be engaged with the connecting hole 30. FIG. 11 shows a state of how the insertion is performed.

In order to enable insertion of the first coupling member 1 into the connection member 3, the connection member 3 has a guide groove 300 provided in the inner circumferential surface thereof. The guide groove 300 is recessed from the inner circumferential surface of the connection member 3 to a radial outer side thereof and extends in the axis direction. The guide groove 300 extends in the axis direction from an end surface of the connection member 3 on a connection side with the first coupling member 1 (namely, an end surface thereof in the axis direction) to reach the connecting hole 30. One guide groove 300 is allotted to each of the plurality of connecting holes 30. When the first coupling member 1 is inserted into or pulled out from inside the connection member 3, the connecting protrusion 10 passes through the guide groove 300 in the axis direction.

Figure 12:
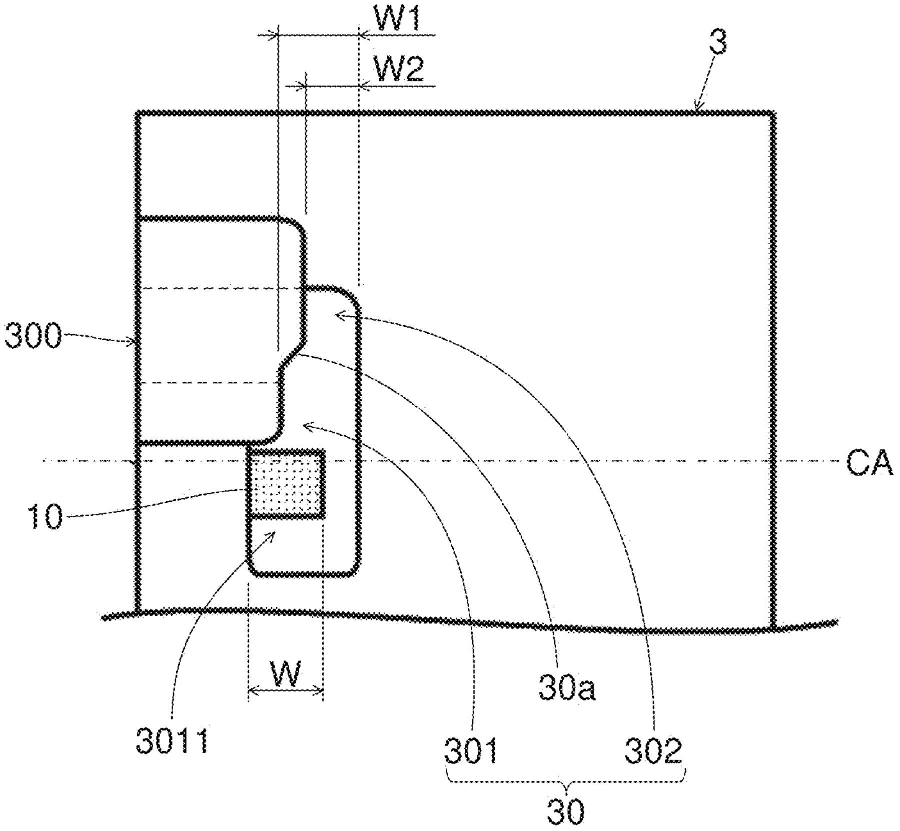
FIG. 12 is a plan view showing a positional relationship and a dimensional relationship between the connecting protrusion and a connecting hole according to the one embodiment.

As shown in FIG. 12, the connecting hole 30 includes a wide region 301 and a narrow region 302 different from each other in opening width in the axis direction. In FIG. 12, an opening width of a part of the wide region 301 on a boundary side with the narrow region 302 in the axis direction is indicated as W1, and an opening width of the narrow region 302 in the axis direction is indicated as W2. Furthermore, in FIG. 12, a width of the connecting protrusion 10 in the axis direction is indicated as W.

The opening width W1 of the wide region 301 is larger than the opening width W2 of the narrow region 302. Furthermore, the opening width W1 of the wide region 301 is larger than the width W of the connecting protrusion 10. On the other hand, the opening width W2 of the narrow region 302 is smaller than the width W of the connecting protrusion 10.

In the connected state where the first coupling member 1 is connected to the second coupling member 2, the connecting protrusion 10 engages with a part of the connecting hole 30 at an edge of the wide region 301. Specifically, the wide region 301 includes an engagement subregion 3011. The engagement subregion 3011 is a subregion of the wide region 301 where the wide region 301 has an opening width in the axis direction larger than in any other subregions thereof. The engagement subregion 3011 is a subregion of the wide region 301 where the wide region 301 has the largest opening width in the axis direction. Furthermore, the engagement subregion 3011 is a subregion having a width in the circumferential direction larger than a width of the connecting protrusion 10 in the circumferential direction. In the connected state where the first coupling member 1 is connected to the second coupling member 2, the connecting protrusion 10 is fitted to the engagement subregion 3011 of the wide region 301 and engages at an edge of the engagement subregion 3011. That is, in the connected state, a state shown in FIG. 12 is brought about.

As viewed from the radial direction, the connecting hole 30 has an opening shape as shown in FIG. 12. As viewed from the radial direction, one of edges of the connecting hole 30 in the axis direction (here, this edge is referred to as one edge) extends in a straight line in a direction orthogonal to the center axis CA. On the other hand, as viewed from the radial direction, the other of the edges of the connecting hole 30 opposite to the one edge in the axis direction (here, this edge is referred to as the other edge) extends stepwise in the direction orthogonal to the center axis CA.

In the connected state where the first coupling member 1 is connected to the second coupling member 2, under the biasing forces of the compression coil springs 102 and 202, the first coupling member 1 and the second coupling member 2 are biased in directions away from each other. Since the connection member 3 is mounted to the second coupling member 2, when the second coupling member 2 is displaced in the axis direction, the connection member 3 is also displaced in the axis direction together with the second coupling member 2. Thus, the connecting protrusion 10 engages at the other edge of the engagement subregion 3011 (namely, a part of the edge extending stepwise).

<States of Valve Mechanisms When Connected and Disconnected>

In the following description, for easier distinction between the second member 12 of the first coupling member 1 and the second member 22 of the second coupling member 2, the second member 12 of the first coupling member 1 is referred to as a first valve housing 12, and the second member 22 of the second coupling member 2 is referred to as a second valve housing 22.

When the first coupling member 1 is connected to the second coupling member 2, the second valve housing 22 is inserted into the first valve housing 12 in the axis direction. When the second valve housing 22 is inserted into the first valve housing 12, the second valve housing 22 contacts the hollow movable valve 101 in the axis direction. When the second valve housing 22 continues to be inserted further into the first valve housing 12, by the second valve housing 22, the hollow movable valve 101 is pressed in a direction against the biasing force of the compression coil spring 102.

Thus, the hollow movable valve 101 is displaced in the direction against the biasing force of the compression coil spring 102. Specifically, the hollow movable valve 101 is displaced to such a position that the first protrusion 1012 does not intimately contact the first scaling portion 100 (namely, the first sealing member Or1). As a result, there is enabled ink circulation inside the first coupling member 1 (see FIG. 5).

Furthermore, when the second valve housing 22 is inserted into the first valve housing 12, the support 103 contacts the movable valve 201 in the axis direction. When the second valve housing 22 continues to be inserted further into the first valve housing 12, by the support 103, the movable valve 201 is pressed in a direction against the biasing force of the compression coil spring 202.

Thus, the movable valve 201 is displaced in the direction against the biasing force of the compression coil spring 202. Specifically, the movable valve 201 is displaced to such a position that the second sealing portion 200 (namely, the second sealing member Or2) does not intimately contact the second protrusion 222. As a result, there is enabled ink circulation inside the second coupling member 2 (see FIG. 5).

Consequently, in the connected state where the first coupling member 1 is connected to the second coupling member 2, i.e., in a state where the second valve housing 22 is inserted into the first valve housing 12 in the axis direction, an ink circulation path in the first coupling member 1 and an ink circulation path in the second coupling member 2 are connected to each other. In the connected state, ink circulates inside the hollow movable valve 101, and the ink also circulates inside the second valve housing 22.

Further, in this embodiment, in the disconnected state where the first coupling member 1 is disconnected from the second coupling member 2, i.e., in a state where the second valve housing 22 has been removed from inside the first valve housing 12, under the biasing force of the compression coil spring 102, the first protrusion 1012 is held at such a position as to intimately contact the first sealing portion 100 (see FIG. 7). This restricts ink circulation inside the first coupling member 1 (specifically, inside the hollow movable valve 101). As a result, in the disconnected state, it is possible to suppress ink leakage from the first coupling member 1.

Furthermore, in the disconnected state, under the biasing force of the compression coil spring 202, the second sealing portion 200 is held at such a position as to intimately contact the second protrusion 222 (see FIG. 9). This restricts ink circulation inside the second coupling member 2 (specifically, inside the second valve housing 22). As a result, in the disconnected state, it is possible to suppress ink leakage from the second coupling member 2.

Figure 13:
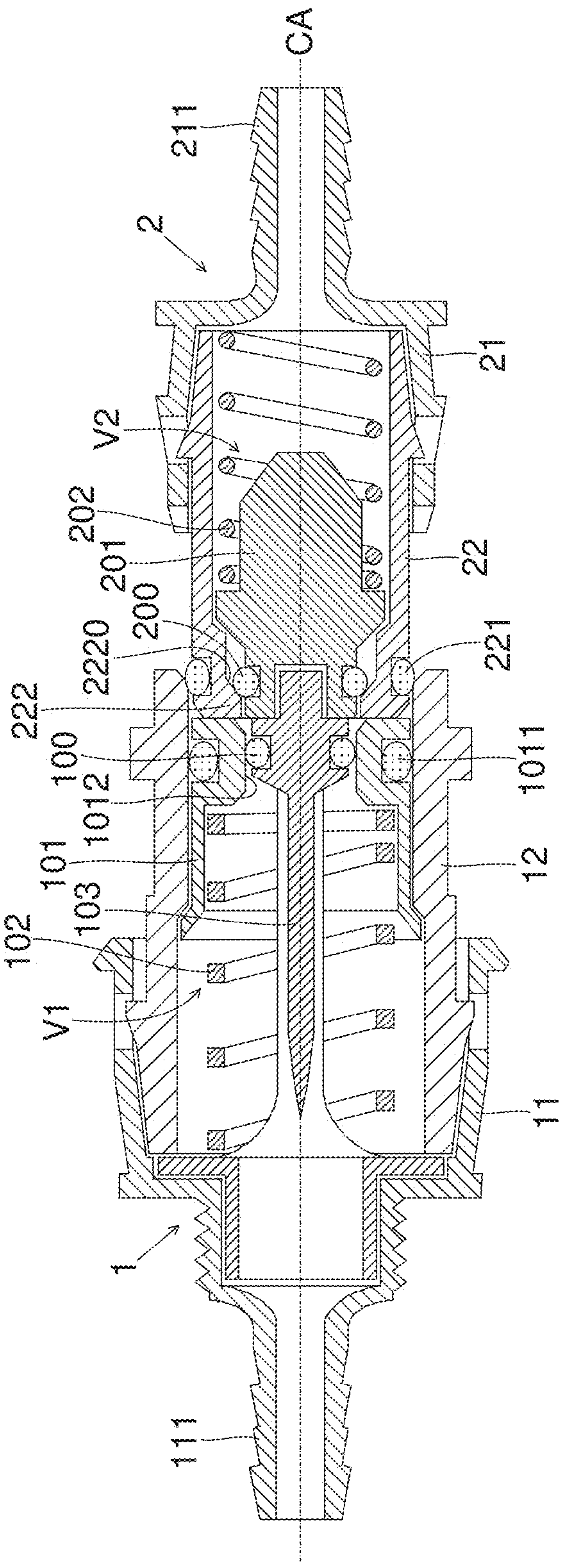
FIG. 13 is a sectional view showing a state at a moment when the first coupling member is separated from the second coupling member according to the one embodiment.

When the connected state is switched to the disconnected state, i.e., when the second valve housing 22 is removed from inside the first valve housing 12, first, a state is brought about where the first sealing portion 100 (namely, the first sealing member Or1) intimately contacts the first protrusion 1012 and the second sealing portion 200 (namely, the second sealing member Or2) intimately contacts the second protrusion 222 (here, this state is referred to as a sealed state). FIG. 13 shows a state at a time (a moment) when the second valve housing 22 is removed from inside the first valve housing 12.

Further, while the sealed state is maintained, the second valve housing 22 is removed from inside the first valve housing 12. That is, after the sealed state has been brought about, the second valve housing 22 is separated from the hollow movable valve 101, and the support 103 is separated from the movable valve 201. Thus, at a time (a moment) when the second valve housing 22 is removed from inside the first valve housing 12, it is possible to suppress ink splattering.

Furthermore, in this embodiment, the second protrusion 222 of the second valve housing 22 has the inclined surface 2220 (see FIG. 9). The inclined surface 2220 is inclined in such a direction as to approach the center axis CA toward the connection side with the first coupling member 1. In other words, a part of the inner circumferential surface of the second valve housing 22 is inclined in such a direction as to approach the center axis CA toward the connection side with the first coupling member 1. The inclined surface 2220 is positioned at an end of the second valve housing 22 on the connection side with the first coupling member 1 (namely, an end thereof in the axis direction).

Further, in the disconnected state where the first coupling member 1 is disconnected from the second coupling member 2, under the biasing force of the compression coil spring 202, the movable valve 201 is biased to the connection side with the first coupling member 1. That is, under the biasing force of the compression coil spring 202, the second sealing portion 200 is biased toward the second protrusion 222. Thus, the second sealing portion 200 (specifically, the second sealing member Or2) intimately contacts the inclined surface 2220 of the second protrusion 222. As a result, it is possible to easily provide sealing against ink leakage from the second coupling member 2.

Here, in this embodiment, the support 103 includes a valve convexity 1031 protruding in the axis direction. Furthermore, the movable valve 201 includes a valve concavity 2011 recessed in the axis direction. The valve convexity 1031 protrudes, in the axis direction, in a cylindrical columnar shape centered about the center axis CA. The valve concavity 2011 has an opening in a circular shape centered about the center axis CA. As viewed from the axis direction, the valve convexity 1031 has a diameter smaller than an opening diameter of the valve concavity 2011. Thus, the valve convexity 1031 can be fitted into the valve concavity 2011.

In this embodiment, in a state where the valve convexity 1031 is fitted into the valve concavity 2011, the second valve housing 22 is inserted into the first valve housing 12. When, in this state, the second valve housing 22 continues to be inserted into the first valve housing 12, the support 103 presses the movable valve 201, and thus the movable valve 201 is displaced in the direction against the biasing force of the compression coil spring 202. As a result, the first coupling member 1 and the second coupling member 2 are brought into the connected state. That is, in the connected state, the valve convexity 1031 is fitted into the valve concavity 2011.

In this configuration, the movable valve 201 is stabilized in posture, and thus when the first coupling member 1 is disconnected from the second coupling member 2, inclining of the movable valve 201 with respect to the axis direction is suppressed, so that the movable valve 201 is smoothly biased in the axis direction under the biasing force of the compression coil spring 202. That is, even when the compression coil spring 202 has a reduced spring load, the movable valve 201 is smoothly displaced in the axis direction.

Thus, the compression coil spring 202 can be set to have a reduced spring load. With the compression coil spring 202 set to have a reduced spring load, when the first coupling member 1 is connected to the second coupling member 2, i.e., when the second valve housing 22 is inserted into the first valve housing 12 so that the support 103 presses the movable valve 201, a force required for this connection can be reduced. As a result, connection workability is improved. Furthermore, when the first coupling member 1 is disconnected from the second coupling member 2, the movable valve 201 is smoothly displaced in the axis direction, and thus disconnection workability is also improved.

The support 103 and the movable valve 201 are molded out of resin. The support 103 has an outer diameter smaller than an outer diameter of the movable valve 201. That is, the support 103 has a thickness in the radial direction smaller than that of the movable valve 201.

In manufacturing a resin molded article, the resin molded article as a finished product might suffer from dimensional errors due to a temperature difference between a surface and an inside of the resin molded article. The larger a thickness of the resin molded article, the larger the temperature difference, so that dimensional accuracy of the resin molded article might be deteriorated.

To address this issue, in this embodiment, the support 103 includes the valve convexity 1031, and the movable valve 201 includes the valve concavity 2011. Further, the second sealing portion 200 is provided in a part of the movable valve 201 overlapping the valve concavity 2011 in the radial direction. That is, a second sealing groove (not assigned a reference sign) is formed in a part of the outer circumferential surface of the movable valve 201, which overlaps the valve concavity 2011 in the radial direction.

In this configuration, the second sealing groove is formed in a part of the movable valve 201 where the movable valve 201 has a reduced thickness. Thus, the second sealing groove can be formed with accuracy. That is, accuracy in attaching the second sealing member Or2 to the movable valve 201 is improved.

<Cleaning of Coupling Members>

In the first coupling member 1, relative to the first valve housing 12, the hollow movable valve 101 is positionally displaced in the axis direction between a position in the connected state where the second coupling member 2 is connected to the first coupling member 1 and a position in the disconnected state where the second coupling member 2 is disconnected from the first coupling member 1. Thus, the first coupling member 1 allows ink circulation therethrough in the connected state, while restricting ink circulation therethrough in the disconnected state.

Furthermore, the first coupling member 1 has such a shape as to be able to suppress a phenomenon in which the hollow movable valve 101 falls off from the first valve housing 12. Specifically, as shown in FIG. 7, the hollow movable valve 101 includes a flange 101*a* as a part thereof where the hollow movable valve 101 has an outer diameter larger than at any other parts thereof. The first valve housing 12 includes a small diameter portion (not assigned a reference sign) having a small inner diameter, a large diameter portion (not assigned a reference sign) having an inner diameter larger than that of the small diameter portion, and a stepped portion as a retainer 12*a* present at a boundary between the small diameter portion and the large diameter portion. In the disconnected state, the flange 101*a* engages with the retainer 12*a* in the axis direction. This suppresses the phenomenon in which the hollow movable valve 101 falls off from the first valve housing 12.

In this configuration, in the connected state where the first coupling member 1 is connected to the second coupling member 2, a gap G is generated between a prescribed part of the hollow movable valve 101 and the first valve housing 12 in the radial direction (see FIG. 5). The prescribed part is a part of the hollow movable valve 101 opposed, in the connected state, to the large diameter portion of the first valve housing 12 in the radial direction.

For example, before shipping of the inkjet recording apparatus 500, the first coupling member 1 is connected to the second coupling member 2, and ink is allowed to circulate therethrough. Further, at a time of shipping of the inkjet recording apparatus 500, in the state where the first coupling member 1 is connected to the second coupling member 2, there is performed, for example, cleaning of the ink circulation paths.

Here, ink is likely to accumulate in the gap G between the hollow movable valve 101 and the first valve housing 12. Failure to appropriately discharge the ink in the gap G makes it difficult to perform replacement of ink with a preservation solution in the gap G. This would lead to an increase in cleaning time.

Figure 14:
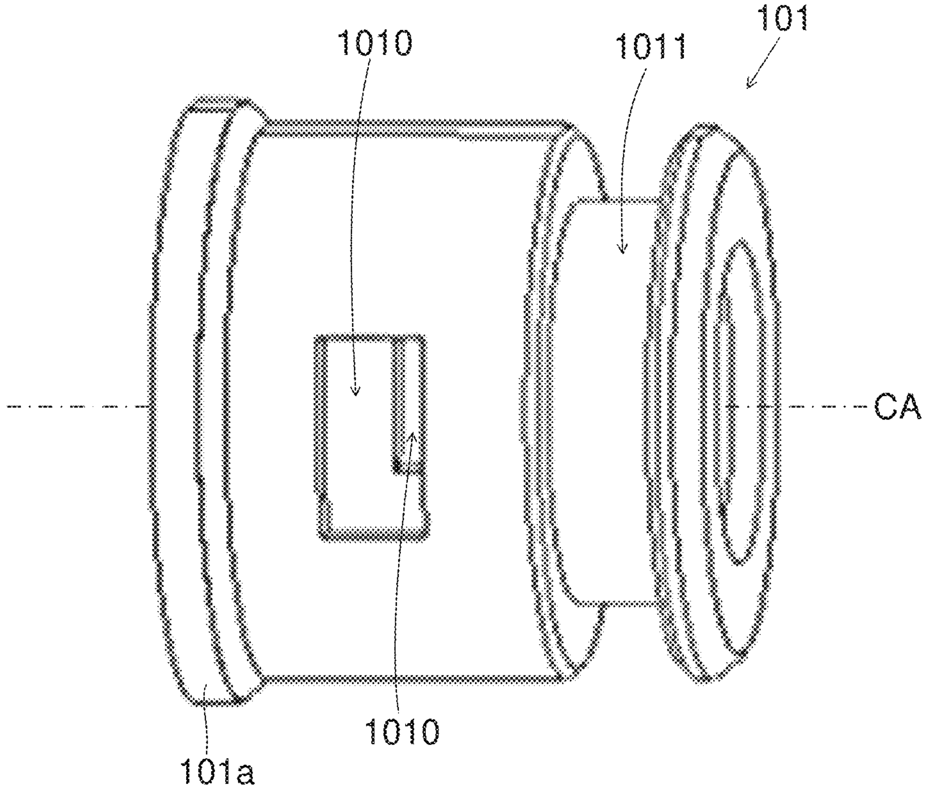
FIG. 14 is a perspective view of a first valve housing according to the one embodiment.

To address this issue, in this embodiment, as shown in FIG. 14, the hollow movable valve 101 has a circulation opening 1010 provided in a prescribed part thereof (namely, the part thereof opposed, in the connected state, to the large diameter portion of the first valve housing 12 in the radial direction). The circulation opening 1010 penetrates through the prescribed part of the hollow movable valve 101 in the radial direction. For example, the circulation opening 1010 has a width in the axis direction not less than a thickness of the hollow movable valve 101 in the radial direction. Furthermore, a plurality of (for example, two) circulation openings 1010 are arranged at equal intervals in the circumferential direction about the center axis CA.

In this embodiment, the hollow movable valve 101 has the circulation opening 1010, and thus ink accumulated in the gap G between the hollow movable valve 101 and the first valve housing 12 can be discharged through the circulation opening 1010. This facilitates cleaning of the first coupling member 1.

The circulation opening 1010 is not limited in shape to a shape shown in FIG. 14.

Figure 15:
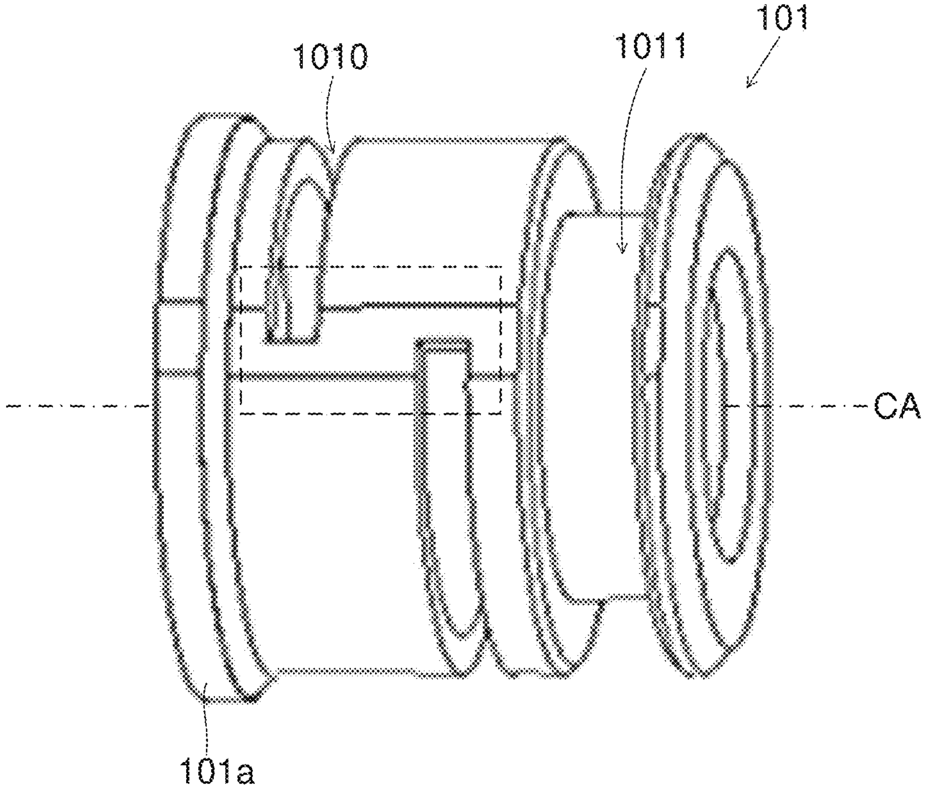
FIG. 15 is a perspective view of a first valve housing according to a first modification example.

For example, the circulation opening 1010 may have a shape as shown in FIG. 15. In a first modification example shown in FIG. 15, the hollow movable valve 101 has a plurality of (for example, two) circulation openings 1010. The plurality of circulation openings 1010 each extend in the circumferential direction. Furthermore, the plurality of circulation openings 1010 are arranged in a staggered manner in the circumferential direction throughout an entire circumference of the hollow movable valve 101 in the circumferential direction. In this configuration, a state is brought about where the circulation openings 1010 are provided throughout the entire circumference of the hollow movable valve 101 in the circumferential direction. Thus, ink accumulated in the gap G between the hollow movable valve 101 and the first valve housing 12 can be favorably discharged.

Figure 16:
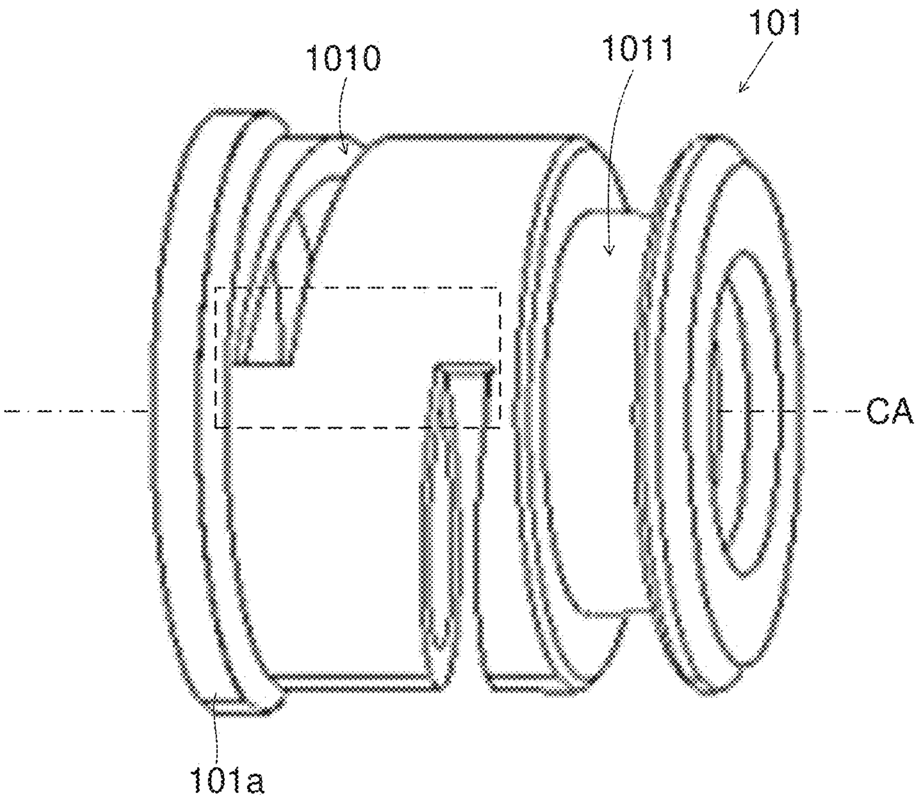
FIG. 16 is a perspective view of a first valve housing according to a second modification example.

The circulation opening 1010 may also have a shape as shown in FIG. 16. In a second modification example shown in FIG. 16, the hollow movable valve 101 has a single circulation opening 1010. The circulation opening 1010 extends in a spiral shape. Furthermore, the circulation opening 1010 has a length in the circumferential direction longer than a full circle around the hollow movable valve 101 in the circumferential direction. In other words, the circulation opening 1010 extends for a distance not less than the full circle around the hollow movable valve 101 in the circumferential direction. In this configuration, a state is brought about where the circulation opening 1010 is provided throughout the entire circumference of the hollow movable valve 101 in the circumferential direction. Thus, ink accumulated in the gap G between the hollow movable valve 101 and the first valve housing 12 can be favorably discharged.

In the configurations shown in FIGS. 15 and 16, there appears a low rigidity area including a plurality of ends of the circulation opening(s) 1010 in the axis direction. In FIGS. 15 and 16, the low rigidity area is enclosed by a broken line. In the configuration shown in FIG. 15, there appear at least two low rigidity areas, while in the configuration shown in FIG. 16, the number of low rigidity areas appearing can be reduced to one. Thus, in the configuration shown in FIG. 16, a decrease in rigidity of the hollow movable valve 101 can be suppressed more than in the configuration shown in FIG. 15.

In FIGS. 14 to 16, the sealing member Or is omitted from illustration.

<Restriction on Rotations of Coupling Members by Use of Concavo-Convex Structure>

In connecting the first coupling member 1 to the second coupling member 2, the second member 12 of the first coupling member 1 is inserted into the connection member 3, in which state the connection member 3 is rotated in one direction relative to the first coupling member 1. Thus, the connecting protrusion 10 reaches such a position as to be engageable with the connecting hole 30 in the axis direction and engages with the connecting hole 30 in the axis direction. That is, the first coupling member 1 engages with the connection member 3 in the axis direction. As a result, there is brought about the connected state where the first coupling member 1 is connected to the second coupling member 2.

Specifically, when the first coupling member 1 is inserted into the connection member 3 in the axis direction, the connecting protrusion 10 is positionally aligned with the guide groove 300 in the circumferential direction (see FIG. 11). In that state, the first coupling member 1 is inserted into the connection member 3 in the axis direction. In other words, when the first coupling member 1 is inserted into the connection member 3, the connecting protrusion 10 passes through the guide groove 300 in the axis direction. In still other words, the first coupling member 1 is inserted thereinto so that the connecting protrusion 10 moves in the axis direction along the guide groove 300. Thus, the connecting protrusion 10 reaches the connecting hole 30.

The guide groove 300 is linked not to the wide region 301 but to the narrow region 302 in the connecting hole 30. That is, when the first coupling member 1 is inserted, the connecting protrusion 10 is guided to the narrow region 302 by the guide groove 300. Accordingly, inserting the first coupling member 1 into the connection member 3 alone does not make it possible to engage the connecting protrusion 10 with the connecting hole 30 in the axis direction.

Figure 17A:
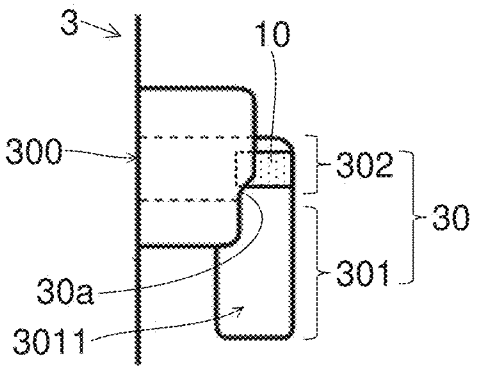
FIG. 17A is a view for explaining a positional relationship between the connecting protrusion and the connecting hole at a time when the first coupling member is connected to and disconnected from the second coupling member according to the one embodiment.
Figure 17B:
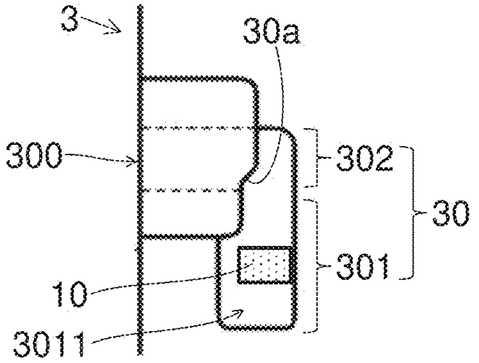
FIG. 17B is a view for explaining a positional relationship between the connecting protrusion and the connecting hole at the time when the first coupling member is connected to and disconnected from the second coupling member according to the one embodiment.
Figure 17C:
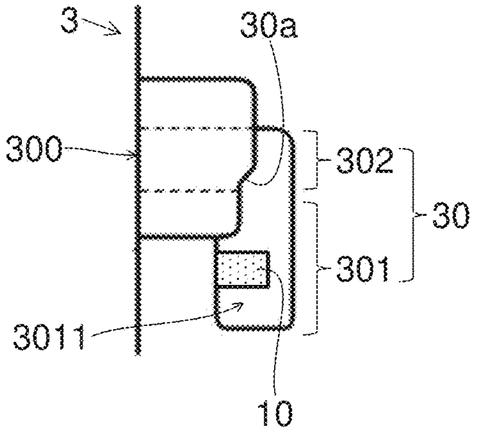
FIG. 17C is a view for explaining a positional relationship between the connecting protrusion and the connecting hole at the time when the first coupling member is connected to and disconnected from the second coupling member according to the one embodiment.

In order to engage the connecting protrusion 10 with the connecting hole 30 in the axis direction, it is required that, after the first coupling member 1 has been inserted into the connection member 3, the connection member 3 be rotated in the one direction relative to the first coupling member 1. Specifically, it is required that, after the first coupling member 1 has been inserted into the connection member 3, the connection member 3 be rotated so that a transition is made among states respectively shown in FIG. 17A, FIG. 17B, and FIG. 17C in this order. In FIGS. 17A to 17C showing these states, a left-right direction in the drawings corresponds to the axis direction, and an up-down direction in the drawings corresponds to the circumferential direction.

When the connection member 3 rotates relative to the first coupling member 1, the connecting protrusion 10 is positionally displaced relative to the connecting hole 30 in the circumferential direction. Thus, it is possible for the connecting protrusion 10 to move from the narrow region 302 to reach the wide region 301 (specifically, the engagement subregion 3011). As a result, the connecting protrusion 10 can be engaged with the connecting hole 30 in the axis direction.

However, when the connection member 3 is rotated relative to the first coupling member 1, the first coupling member 1 might rotate together with the connection member 3, in which case it is not possible for the connecting protrusion 10 to reach such a position as to be engageable with the connecting hole 30 in the axis direction. That is, even by rotating the connection member 3 in the one direction, it is not possible to engage the connecting protrusion 10 with the connecting hole 30 in the axis direction.

Figure 18:
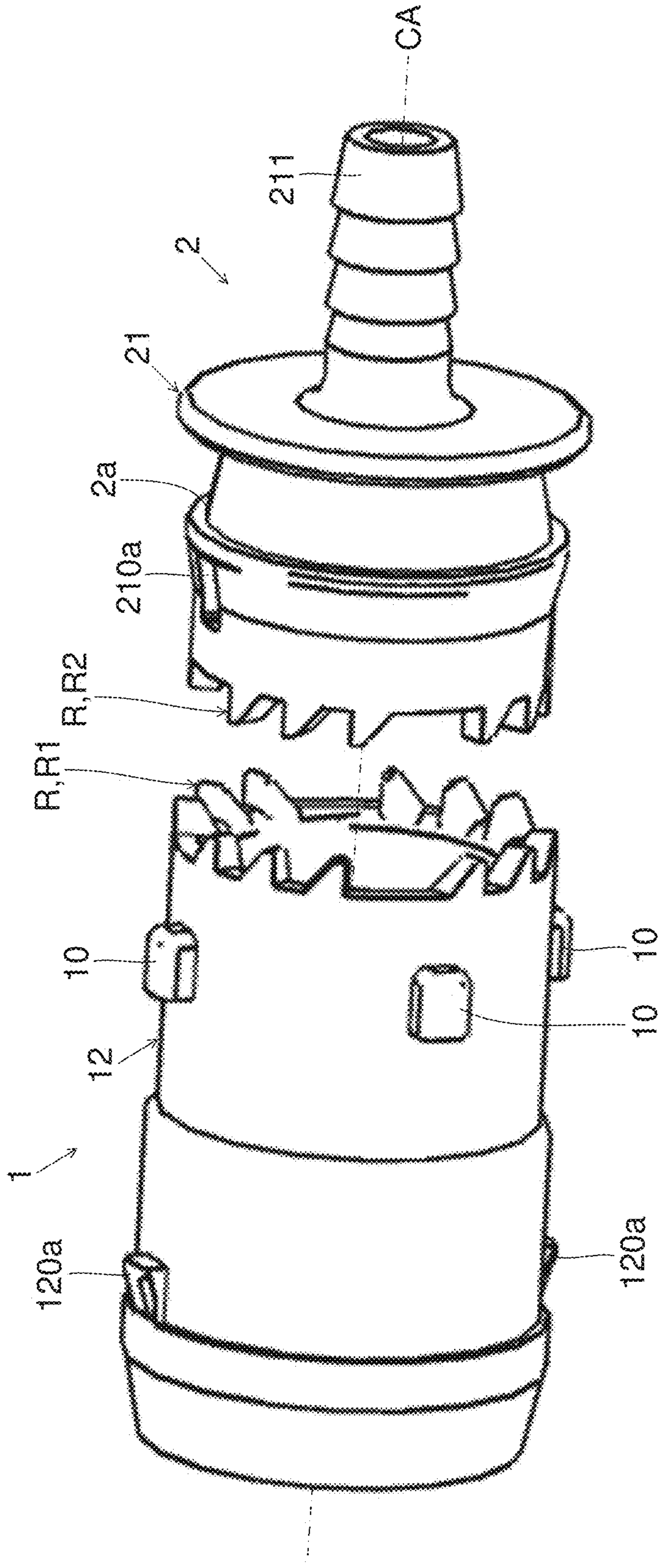
FIG. 18 is a perspective view of and around respective concavo-convex structures of the first and second coupling members according to the one embodiment.

To suppress this inconvenience, in this embodiment, as shown in FIG. 18, the first coupling member 1 and the second coupling member 2 are each provided with a rotation restricting portion. The first coupling member 1 and the second coupling member 2 each include, as the rotation restricting portion, a concavo-convex structure R having irregularities in the axis direction. The concavo-convex structure R includes a plurality of convexities periodically arrayed in the circumferential direction. In other words, the concavo-convex structure R includes a plurality of convexities arranged at a prescribed periodic angle θ in the circumferential direction. Regions between adjacent ones of the convexities in the circumferential direction constitute concavities. Hereinafter, where necessary, for the sake of distinction, the concavo-convex structure R of the first coupling member 1 may be denoted by a reference sign R1, and the concavo-convex structure R of the second coupling member 2 may be denoted by a reference sign R2.

The concavo-convex structure R is provided at each of parts of the first coupling member 1 and the second coupling member 2 opposed to each other in the axis direction. That is, the concavo-convex structure R1 is provided at an end of the second member 12 of the first coupling member 1 in the axis direction. The concavo-convex structure R2 is provided at an end of the second member 22 (namely, the second valve housing 22) of the second coupling member 2 in the axis direction. Thus, the respective concavo-convex structures R of the first coupling member 1 and the second coupling member 2 can be engaged with each other in the circumferential direction. The convexities of the concavo-convex structure R1 are fitted into the concavities of the concavo-convex structure R2, and the convexities of the concavo-convex structure R2 are fitted into the concavities of the concavo-convex structure R1, so that the respective concavo-convex structures R of the first coupling member 1 and the second coupling member 2 engage with each other in the circumferential direction. The first coupling member 1 is inserted into the connection member 3, and thus the respective concavo-convex structures R of the first coupling member 1 and the second coupling member 2 can be engaged with each other in the circumferential direction.

In this configuration, when the connection member 3 is rotated relative to the first coupling member 1, the respective concavo-convex structures R of the first coupling member 1 and the second coupling member 2 are engaged with each other in the circumferential direction, and thus it is possible to suppress a phenomenon in which the first coupling member 1 rotates together with the connection member 3. This improves workability in connecting the first coupling member 1 to the second coupling member 2. Workability in disconnecting the first coupling member 1 from the second coupling member 2 (which will be detailed later) is also improved. Furthermore, it is possible to suppress unintended twisting of the tube TU connected to the first coupling member 1, thus eliminating the need to untwist the tube TU (or to suppress such twisting).

Furthermore, in this embodiment, the first coupling member 1 and the second coupling member 2 include the compression coil springs 102 and 202, respectively. In the connected state where the first coupling member 1 is connected to the second coupling member 2, under the biasing forces of the compression coil springs 102 and 202, the first coupling member 1 and the second coupling member 2 are biased away from each other in the axis direction.

Figure 19A:
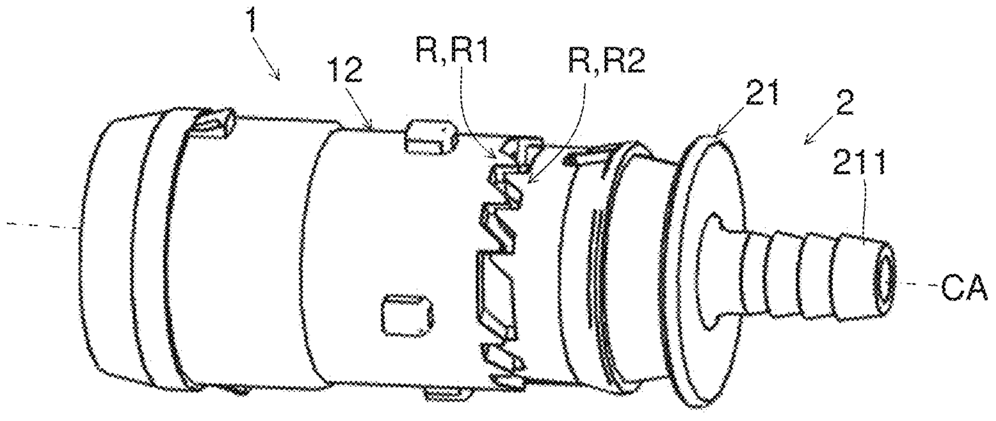
FIG. 19A is a view for explaining a positional relationship between the respective concavo-convex structures of the first and second coupling members according to the one embodiment.
Figure 19B:
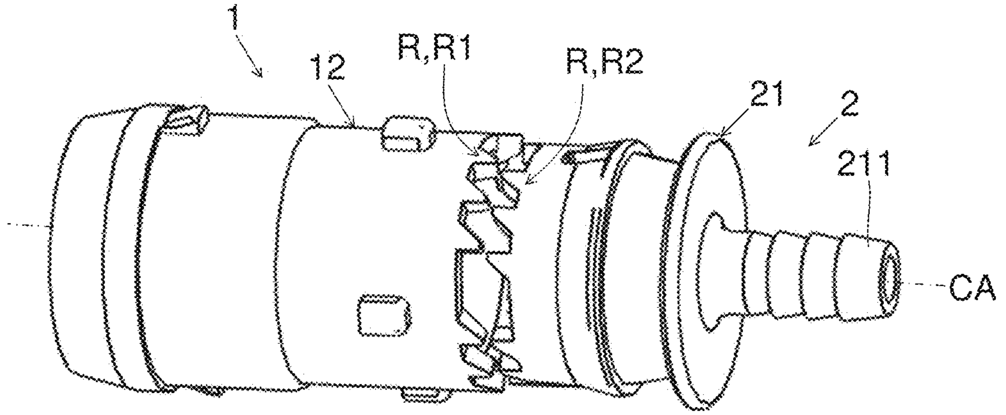
FIG. 19B is a view for explaining a positional relationship between the respective concavo-convex structures of the first and second coupling members according to the one embodiment.

At this time, since the connecting protrusion 10 is positioned in the wide region 301 (specifically, the engagement subregion 3011), a transition is made from the state shown in FIG. 17B to the state shown in FIG. 17C. Thus, as shown in FIGS. 19A and 19B, a transition is made from a state where the respective concavo-convex structures R of the first coupling member 1 and the second coupling member 2 engage with each other in the circumferential direction (a state shown in FIG. 19A) to a state where the respective concavo-convex structures R of the first coupling member 1 and the second coupling member 2 are away from each other in the axis direction (a state shown in FIG. 19B). That is, the respective concavo-convex structures R of the first coupling member 1 and the second coupling member 2 are disengaged from each other.

When the respective concavo-convex structures R of the first coupling member 1 and the second coupling member 2 are away from each other in the axis direction, the first coupling member 1 and the second coupling member 2 can be individually and freely rotated. Thus, in a case where the tube TU is found to be twisted after the first coupling member 1 has been connected to the second coupling member 2, it is possible to untwist the tube TU while maintaining connection between the first coupling member 1 and the second coupling member 2.

Figure 20:
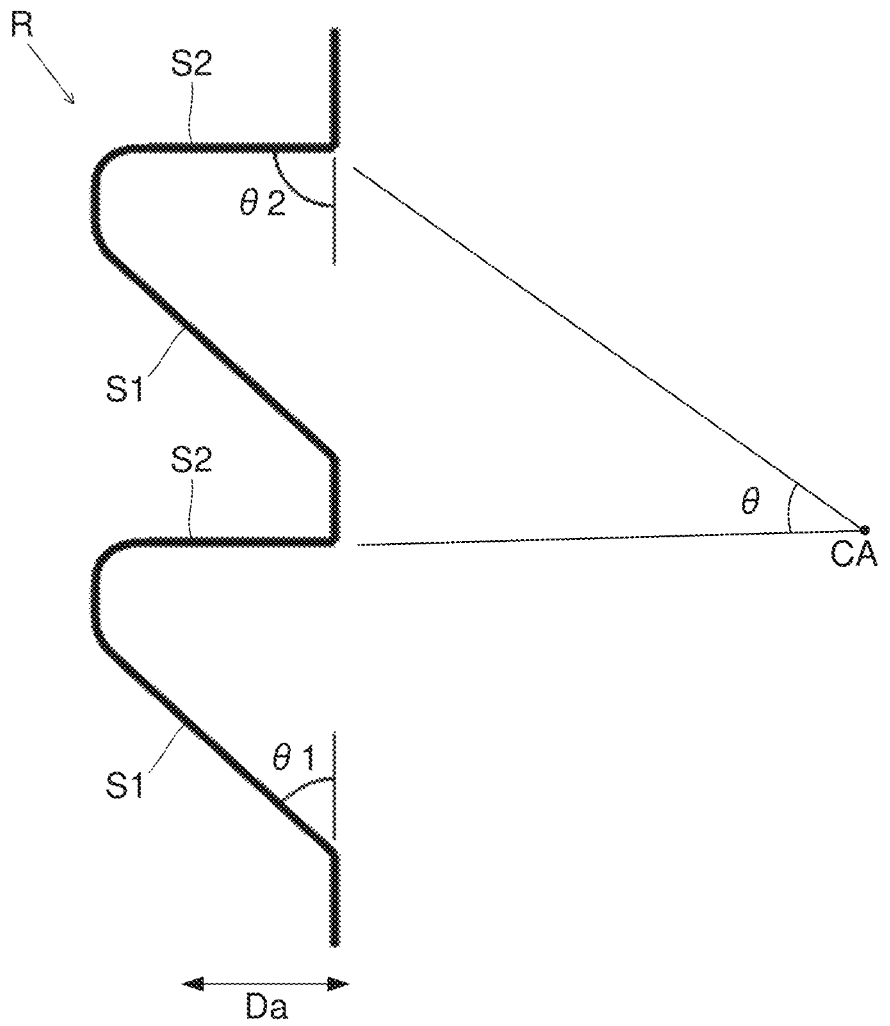
FIG. 20 is an enlarged plan view of the concavo-convex structure according to the one embodiment.

Furthermore, in this embodiment, the concavo-convex structure R has a shape as shown in FIG. 20 when viewed from the radial direction. In FIG. 20, the axis direction is indicated by a double-headed arrow Da. That is, in FIG. 20, a left-right direction in the drawing corresponds to the axis direction, and an up-down direction in the drawing corresponds to the circumferential direction.

The convexities of the concavo-convex structure R each have a shape tapering down from a root toward a distal end thereof. Thus, regardless of respective positions of the first coupling member 1 and the second coupling member 2 in the circumferential direction, it becomes easier to fit the convexities of the concavo-convex structure R of one of the first coupling member 1 and the second coupling member 2 into the concavities of the concavo-convex structure R of the other of them. That is, the respective concavo-convex structures R of the first coupling member 1 and the second coupling member 2 can be easily engaged with each other.

Furthermore, in this embodiment, as viewed from the radial direction, a first side surface S1 of each of the convexities of the concavo-convex structure R facing one side in the circumferential direction is inclined 45° or more with respect to a direction orthogonal to the center axis CA. That is, as viewed from the radial direction, the first side surface S1 forms a first angle θ1 of 45° or more with the direction orthogonal to the center axis CA. Thus, it becomes still easier to fit the convexities of the concavo-convex structure R of one of the first coupling member 1 and the second coupling member 2 into the concavities of the concavo-convex structure R of the other of them.

Furthermore, in this embodiment, as viewed from the radial direction, a second side surface S2 of each of the convexities of the concavo-convex structure R facing the other side in the circumferential direction oppositely to the first side surface S1 forms, with the direction orthogonal to the center axis CA, a second angle θ2 larger than the first angle θ1. For example, the first angle θ1 is about 45°, and the second angle θ2 is about 90°.

Further, in this embodiment, the second side surface S2 of the concavo-convex structure R of one of the first coupling member 1 and the second coupling member 2 and the second side surface S2 of the concavo-convex structure R of the other of them engage with each other in the circumferential direction. Thus, it is possible to stabilize engagement between the concavo-convex structure R of one of the first coupling member 1 and the second coupling member 2 and the concavo-convex structure R of the other of them in the circumferential direction.

<End Surface Shape of Connection Member in Axis Direction>

In connecting the first coupling member 1 to the second coupling member 2, it is required to rotate the connection member 3. If it is possible to grasp a body of the connection member 3 with fingers, the connection member 3 can be easily rotated. There is, however, a case where an installation space of the flow path connection mechanism 1000 is too small. In such a case, it is impossible to grasp the body of the connection member 3 with fingers, rendering it difficult to rotate the connection member 3.

Figure 21:
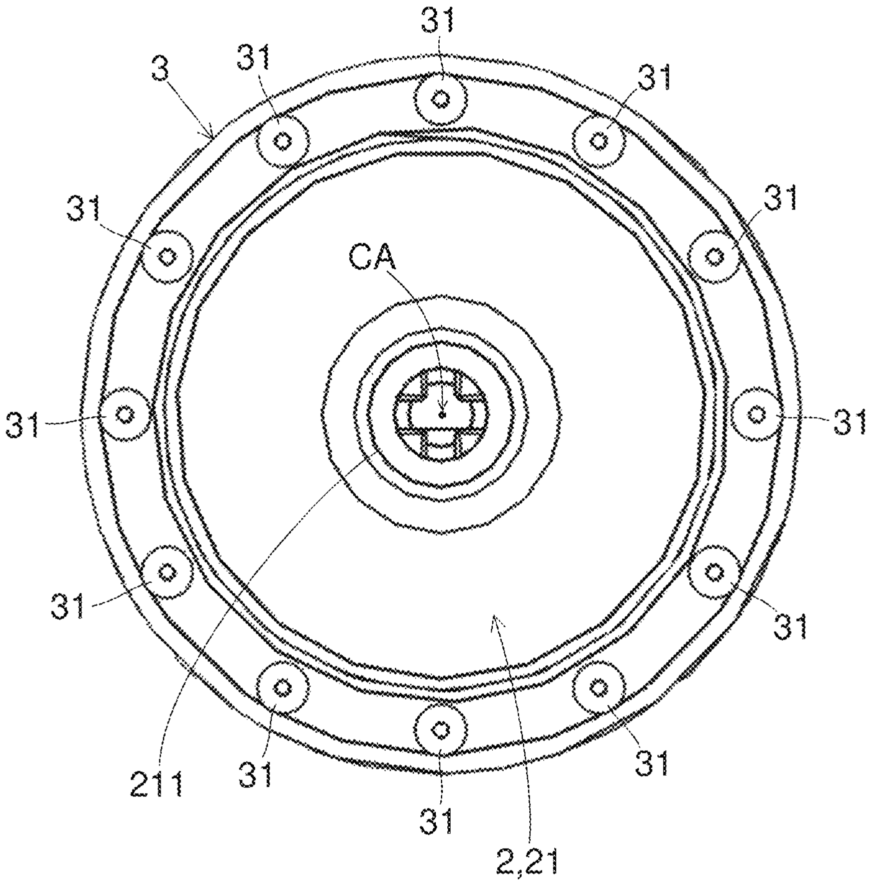
FIG. 21 is a plan view, as viewed from an axis direction, of the connection member according to the one embodiment.
Figure 22:
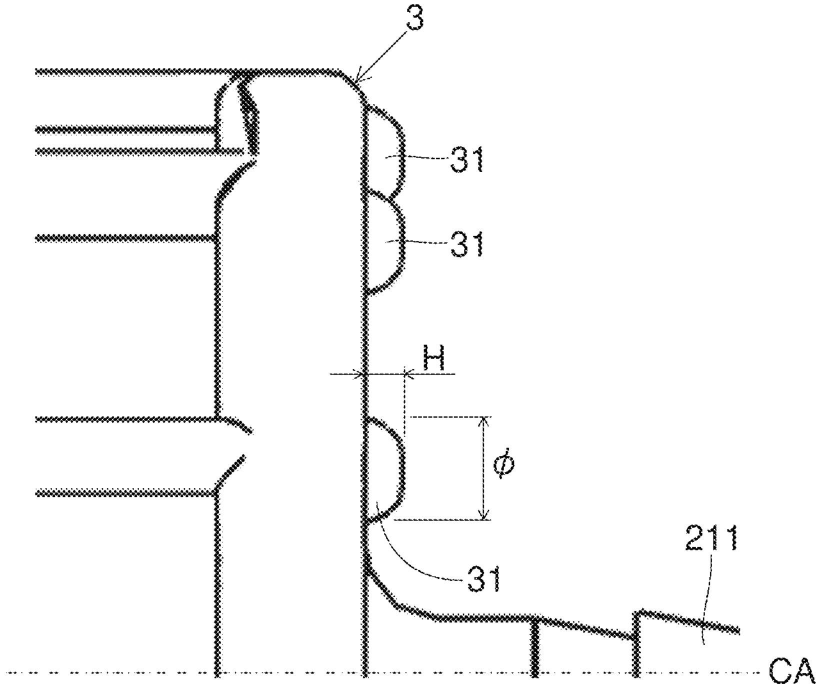
FIG. 22 is an enlarged view of convexities of the connection member according to the one embodiment.

To address this issue, in this embodiment, as shown in FIGS. 21 and 22, the connection member 3 includes convexities 31 provided on an end surface thereof in the axis direction and protruding in the axis direction. The convexities 31 protrude in the axis direction from the end surface of the connection member 3 opposite to the connection side with the first coupling member 1. The end surface of the connection member 3 opposite to the connection side with the first coupling member 1 is used as a work surface to be touched with fingers by an operator who rotates the connection member 3. In the following description, for the sake of convenience, the end surface of the connection member 3 opposite to the connection side with the first coupling member 1 is referred to as a work surface. The convexities 31 function as a slippage prevention means for preventing fingers from slipping off the work surface of the connection member 3.

In this configuration, in rotating the connection member 3, pads of fingers are pressed against the work surface of the connection member 3, and thus a state is brought about where the fingers are hooked on the convexities 31. When, in that state, the fingers are moved in the circumferential direction, the connection member 3 is rotated. Thus, there is no need to grasp the body of the connection member 3 with the fingers. As a result, even when the installation space of the flow path connection mechanism 1000 is too small, it is facilitated to rotate the connection member 3. That is, workability in connecting the first coupling member 1 to the second coupling member 2 is improved. Workability in disconnecting the first coupling member 1 from the second coupling member 2 (which will be detailed later) is also improved.

Furthermore, in this embodiment, the second coupling member 2 is inserted into the first coupling member 1, and thus the ink circulation path in the first coupling member 1 is connected to the ink circulation path in the second coupling member 2 in the axis direction. In this configuration, there is no need for a sealing member for preventing liquid leakage between the connection member 3 and each of the first coupling member 1 and the second coupling member 2 in the radial direction.

Therefore, in this embodiment, the connection member 3 is rotatable without the possibility of sliding against the sealing member for preventing liquid leakage. Thus, without the need to grasp the body of the connection member 3 with fingers, the connection member 3 can be easily rotated simply by pressing pads of the fingers against the work surface of the connection member 3 and moving the fingers in the circumferential direction.

Furthermore, in this embodiment, a plurality of convexities 31 are provided. Further, the plurality of convexities 31 are arranged at equal intervals of 45° or less in the circumferential direction about the center axis CA. Thus, regardless of a position of the connection member 3 in the circumferential direction, it is possible to easily press pads of fingers against parts of the connection member 3 where the convexities 31 are present.

Furthermore, in this embodiment, the convexities 31 protrude in a hemispherical shape in the axis direction from the work surface of the connection member 3. Further, as viewed from the axis direction, the convexities 31 each have a diameter φ not less than twice a protruding height H thereof (namely, a width thereof in the axis direction). The convexities 31 are set to have such dimensions and thus can reliably function as the slippage prevention means. Furthermore, when the convexities 31 are touched with fingers, no pain is caused in the fingers.

<Disengagement of Connecting Protrusion from Connecting Hole>

For example, for maintenance purposes, the first coupling member 1 is disconnected from the second coupling member 2. In order to disconnect the first coupling member 1 from the second coupling member 2, it is required that the connecting protrusion 10 be disengaged from the connecting hole 30.

In disengaging the connecting protrusion 10 from the connecting hole 30, the connection member 3 is rotated so that a transition is made among the states respectively shown in FIG. 17C, FIG. 17B, and FIG. 17A in this order. That is, from a state where the connecting protrusion 10 engages with the wide region 301 (specifically, the engagement subregion 3011), the connection member 3 is rotated so that the connecting protrusion 10 is positionally aligned with the guide groove 300 in the circumferential direction. Thus, by pulling the first coupling member 1 and the second coupling member 2 apart from each other in the axis direction, it is possible to disengage the connecting protrusion 10 from the connecting hole 30.

In an assumed case where, when the first coupling member 1 and the second coupling member 2 are pulled apart from each other in the axis direction, the connecting protrusion 10 gets caught by an edge of the connecting hole 30 in the axis direction, it becomes difficult to pull the second coupling member 2 apart from the first coupling member 1. In this case, forcibly pulling the second coupling member 2 apart from the first coupling member 1 might result in a breakdown.

To suppress such an inconvenience, in this embodiment, the opening width W2 of the narrow region 302 in the axis direction is set to be smaller than the width W of the connecting protrusion 10 in the axis direction. In this configuration, from the state where the connecting protrusion 10 engages with the wide region 301 (namely, the connected state where the first coupling member 1 is connected to the second coupling member 2), the connection member 3 is rotated in the other direction opposite to the one direction (namely, a direction in which the connection member 3 is rotated so that the first coupling member 1 is connected to the second coupling member 2), and thus at least a part of the connecting protrusion 10 enters a radial inner side of an outer periphery of the narrow region 302 (see FIG. 17A).

Further, in a state where at least the part of the connecting protrusion 10 has entered the radial inner side of the outer periphery of the narrow region 302, the first coupling member 1 and the second coupling member 2 are pulled apart from each other in the axis direction. Thus, it is possible to suppress a phenomenon in which the connecting protrusion 10 gets caught by the edge of the connecting hole 30 in the axis direction. In other words, it is possible to smoothly pull the second coupling member 2 apart from the first coupling member 1. This improves workability in disconnecting the first coupling member 1 from the second coupling member 2.

In the state where at least the part of the connecting protrusion 10 has entered the radial inner side of the outer periphery of the narrow region 302, the connecting protrusion 10 and the guide groove 300 are positionally aligned with each other in the circumferential direction. Accordingly, by bringing about the state where at least the part of the connecting protrusion 10 has entered the radial inner side of the outer periphery of the narrow region 302, it is possible to move the second coupling member 2 away from the first coupling member 1 in the axis direction. At this time, the connecting protrusion 10 passes through the guide groove 300, and this prevents an inconvenience that the second coupling member 2 is inhibited from moving in the axis direction due to the connecting protrusion 10 contacting the connection member 3.

Furthermore, in this embodiment, when viewed from the radial direction, a boundary portion 30*a*, as a part of the edges of the connecting hole 30, between the wide region 301 and the narrow region 302 is inclined with respect to the direction orthogonal to the center axis CA. Thus, when the connection member 3 is rotated so that the connecting protrusion 10 enters the radial inner side of the outer periphery of the narrow region 302, it is possible to suppress occurrence of an inconvenience that the connection member 3 is inhibited from rotating due to the connecting protrusion 10 getting caught by the boundary portion 30*a* between the wide region 301 and the narrow region 302. That is, it is possible for the connecting protrusion 10 to smoothly move from the wide region 301 to reach the narrow region 302.

When viewed in a cross section cut along a plane orthogonal to the center axis CA, the connecting protrusion 10 has a shape as shown in FIGS. 23A, 23B, 24A, and 24B. That is, the connecting protrusion 10 has R-chamfered corners in the circumferential direction. However, there is no limitation thereto, and the connecting protrusion 10 may have C-chamfered corners in the circumferential direction. With the connecting protrusion 10 having R-chamfered or C-chamfered corners in the circumferential direction, it is possible to further suppress the occurrence of the inconvenience that the connection member 3 is inhibited from rotating due to the connecting protrusion 10 getting caught by the boundary portion 30*a* between the wide region 301 and the narrow region 302.

<Dimensions of Connecting Protrusion>

In connecting the first coupling member 1 to the second coupling member 2, first, the connecting protrusion 10 is fitted into the guide groove 300, in which state the first coupling member 1 is inserted into the connection member 3. That is, the connecting protrusion 10 passes through the guide groove 300 in the axis direction. At this time, while being guided by the guide groove 300, the connecting protrusion 10 moves in the axis direction. Accordingly, rotation of the connection member 3 (namely, a displacement thereof in the circumferential direction) is restricted by the connecting protrusion 10.

The first coupling member 1 continues to be inserted into the connection member 3, and thus the respective concavo-convex structures R of the first coupling member 1 and the second coupling member 2 start to contact each other. At this time, the connecting protrusion 10 is still in a state of being fitted into the guide groove 300 (the state shown in FIG. 17A). That is, in this state, rotation of the connection member 3 is restricted by the connecting protrusion 10.

When the respective concavo-convex structures R of the first coupling member 1 and the second coupling member 2 start to contact each other, the convexities of the concavo-convex structure R of one of them may be abutting on the convexities of the concavo-convex structure R the other of them. In this case, relative to the convexities of the concavo-convex structure R of the one of them, the convexities of the concavo-convex structure R of the other of them are displaced in the circumferential direction, and thus the convexities of the concavo-convex structure R of the one of them are fitted into the concavities of the concavo-convex structure R of the other of them.

In an assumed case where, relative to the convexities of the concavo-convex structure R of one of the first coupling member 1 and the second coupling member 2, the convexities of the concavo-convex structure R of the other of them are not displaced in the circumferential direction, the convexities of the concavo-convex structure R of the one of them and the convexities of the concavo-convex structure R of the other of them are kept abutting on each other. In this case, the respective concavo-convex structures R of the one and the other of them cannot be engaged with each other.

Therefore, an appropriate play is provided between the connecting protrusion 10 and the guide groove 300 in the circumferential direction. A specific description thereof follows. In the following description, a periodic angle at which the plurality of convexities of the concavo-convex structure R are arranged (corresponding namely to the prescribed periodic angle θ) is referred to as a convexity periodic angle.

Figure 23A:
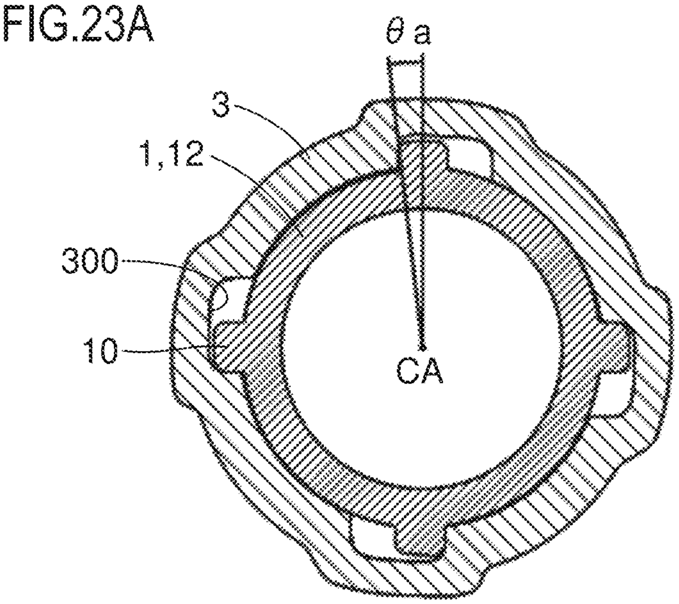
FIG. 23A is a view for explaining a play in a circumferential direction between the connecting protrusion and the guide groove according to the one embodiment.
Figure 23B:
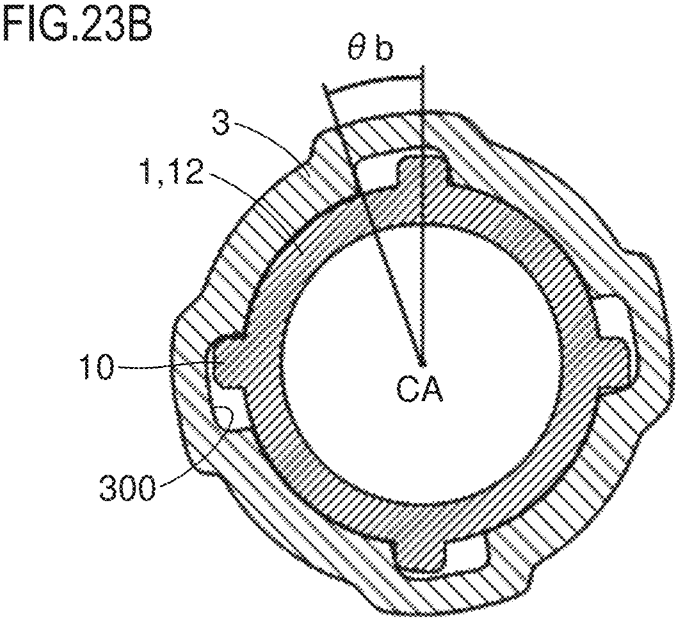
FIG. 23B is a view for explaining a play in the circumferential direction between the connecting protrusion and the guide groove according to the one embodiment.

Furthermore, in the following description, a rotation angle of the connection member 3 by which the connection member 3 is rotated from a state where the connecting protrusion 10 fitted into the guide groove 300 abuts on one side surface of the guide groove 300 in the circumferential direction to a state where the connecting protrusion 10 abuts on the other side surface of the guide groove 300 in the circumferential direction is referred to as a first rotation angle. An angle obtained by subtracting an angle θa shown in FIG. 23A from an angle θb shown in FIG. 23B corresponds to the first rotation angle. FIG. 23A shows the state where the connecting protrusion 10 abuts on the one side surface of the guide groove 300. FIG. 23B shows the state where the connecting protrusion 10 abuts on the other side surface of the guide groove 300.

In this embodiment, the first rotation angle is set to not less than ½ of the convexity periodic angle. Thus, when the first coupling member 1 is inserted into the connection member 3, the convexities of the concavo-convex structure R of one of the first coupling member 1 and the second coupling member 2 can be smoothly fitted into the concavities of the concavo-convex structure R of the other of them. As a result, workability in connecting the first coupling member 1 to the second coupling member 2 is improved.

Also in disconnecting the first coupling member 1 from the second coupling member 2, it is required to rotate the connection member 3 relative to the first coupling member 1. Specifically, in disconnecting them, first, the connection member 3 is pressed in directions against the biasing forces of the compression coil springs 102 and 202 (hereinafter, these directions are referred to as counter-biasing directions). Thus, the respective concavo-convex structures R of the first coupling member 1 and the second coupling member 2 engage with each other in the circumferential direction. That is, a transition is made from the state shown in FIG. 19B to the state shown in FIG. 19A.

After that, the connection member 3 is rotated in the other direction opposite to the one direction (namely, the direction in which the connection member 3 is rotated so that the first coupling member 1 is connected to the second coupling member 2). At this time, since the respective concavo-convex structures R of the first coupling member 1 and the second coupling member 2 engage with each other in the circumferential direction, the connection member 3 rotates relative to the first coupling member 1. That is, the connecting hole 30 is displaced relative to the connecting protrusion 10 in the circumferential direction. Thus, the connecting protrusion 10 enters the radial inner side of the outer periphery of the narrow region 302. As a result, a state is brought about where the first coupling member 1 can be pulled out from inside the connection member 3.

Here, when the connection member 3 is pressed in the counter-biasing directions, the convexities of the concavo-convex structure R of the first coupling member 1 may abut on the convexities of the concavo-convex structure R of the second coupling member 2. In this case, it is required that, relative to the convexities of the concavo-convex structure R of one of them, the convexities of the concavo-convex structure R of the other of them be displaced in the circumferential direction so that the convexities of the concavo-convex structure R of the one of them are fitted into the concavities of the concavo-convex structure R of the other of them.

To this end, an appropriate play is provided also between the connecting protrusion 10 and the connecting hole 30 in the connected state. In other words, an appropriate play is provided between the engagement subregion 3011 of the connecting hole 30 and the connecting protrusion 10 in the circumferential direction. A specific description thereof follows.

Figure 24A:
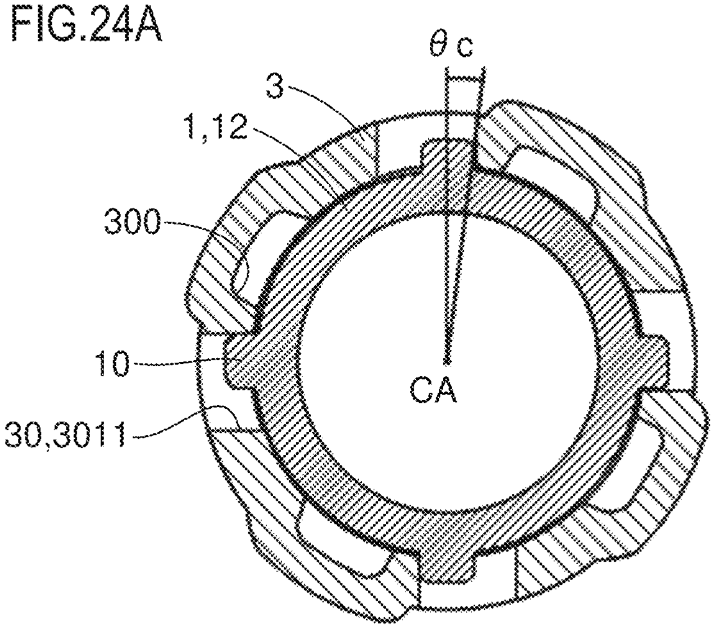
FIG. 24A is a view for explaining a play in the circumferential direction between the connecting protrusion and an engagement subregion of the connecting hole according to the one embodiment.
Figure 24B:
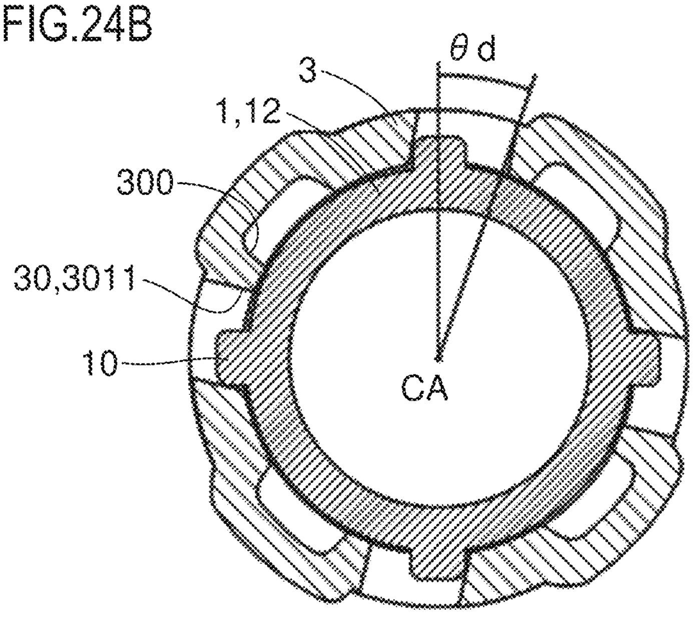
FIG. 24B is a view for explaining a play in the circumferential direction between the connecting protrusion and the engagement subregion of the connecting hole according to the one embodiment.

In the following description, a rotation angle of the connection member 3 by which the connection member 3 is rotated from a state where the connecting protrusion 10 fitted into the engagement subregion 3011 abuts on one inner edge of the engagement subregion 3011 in the circumferential direction to a state where the connecting protrusion 10 abuts on the other inner edge of the engagement subregion 3011 in the circumferential direction is referred to as a second rotation angle. An angle obtained by subtracting an angle θc shown in FIG. 24A from an angle Od shown in FIG. 24B corresponds to the second rotation angle. FIG. 24A shows the state where the connecting protrusion 10 abuts on the one inner edge of the engagement subregion 3011. FIG. 24B shows the state where the connecting protrusion 10 abuts on the other inner edge of the engagement subregion 3011.

In this embodiment, the second rotation angle is set to not less than ½ of the convexity periodic angle. Thus, when the connection member 3 is pressed in the counter-biasing directions so that the first coupling member 1 is disconnected from the second coupling member 2, the convexities of the concavo-convex structure R of one of them can be smoothly fitted into the concavities of the concavo-convex structure R of the other of them. As a result, workability in disconnecting the first coupling member 1 from the second coupling member 2 is improved.

The embodiment disclosed herein is to be construed in all respects as illustrative and not limiting. The scope of the present disclosure is indicated by the appended claims rather than by the description of the foregoing embodiment, and all changes that come within the meaning and range of equivalency of the claims are intended to be embraced therein.

For example, while the foregoing embodiment has described the inkjet recording apparatus that allows ink circulation therein, the present disclosure is not limited to inkjet recording apparatuses and is applicable also to apparatuses that allow circulation of a liquid other than ink. That is, the flow path connection mechanism including the coupling member can also allow circulation of a liquid other than ink.

What is claimed is:

1. A flow path connection mechanism, comprising:

a first coupling member that is a tubular body whose center axis is an axis extending in a prescribed direction and includes inside a circulation path for a liquid;

a second coupling member that is a tubular body centered about the center axis, is connected to the first coupling member in an axis direction, and includes inside a circulation path for the liquid so that the liquid is allowed to circulate through the first and second coupling members in the axis direction; and a connection member that connects the first coupling member to the second coupling member, wherein the connection member has a cylindrical shape centered about the center axis and is mounted to the second coupling member so as to be rotatable about the center axis, one of the first coupling member and the connection member includes a connecting protrusion protruding in a radial direction, and another of the first coupling member and the connection member has a connecting hole into which the connecting protrusion is insertable in the radial direction, the first coupling member is inserted into the connection member in the axis direction, and the connection member is rotated in one direction relative to the first coupling member, so that the connecting protrusion reaches such a position as to be engageable with the connecting hole in the axis direction, and thus a connected state is brought about where the first coupling member is connected to the second coupling member, the first and second coupling members each include a concavo-convex structure, the concavo-convex structure is provided in each of parts of the first and second coupling members opposed to each other in the axis direction, the first coupling member is inserted into the connection member, and thus the respective concavo-convex structures of the first and second coupling members engage with each other in a circumferential direction, the concavo-convex structure includes a plurality of convexities arranged at a prescribed periodic angle in the circumferential direction, as viewed from the radial direction, the convexities each have a shape tapering down from a root toward a distal end thereof, the connection member has a guide groove, the guide groove is recessed from an inner circumferential surface of the connection member to a radial outer side thereof and extends in the axis direction from an end surface of the connection member on a connection side with the first coupling member to reach the connecting hole, when the first coupling member is inserted into or pulled out from inside the connection member, the connecting protrusion is fitted into the guide groove and passes through the guide groove in the axis direction, and a rotation angle of the connection member by which the connection member is rotated from a state where the connecting protrusion fitted into the guide groove abuts on one side surface of the guide groove in the circumferential direction to a state where the connecting protrusion abuts on another side surface of the guide groove in the circumferential direction is not less than ½ of the prescribed periodic angle.

2. The flow path connection mechanism according to claim 1, wherein at least one of the first and second coupling members includes a biasing member that generates a biasing force in the axis direction, the biasing member biases the first and second coupling members in a direction away from each other, and in the connected state, by the biasing member, the first and second coupling members are biased in the direction away from each other, and thus the respective concavo-convex structures of the first and second coupling members are away from each other in the axis direction.

3. The flow path connection mechanism according to claim 2, wherein from the connected state, the connection member is pressed in a direction against the biasing force of the biasing member so that the respective concavo-convex structures of the first and second coupling members engage with each other in the circumferential direction, and then the connection member is rotated in another direction opposite to the one direction, so that a state is brought about where the first coupling member is able to be pulled out from inside the connection member, in the connected state, the connecting protrusion is fitted into an engagement subregion of the connecting hole, which has a width in the circumferential direction larger than a width of the connecting protrusion in the circumferential direction, and a rotation angle of the connection member by which the connection member is rotated from a state where the connecting protrusion fitted into the engagement subregion abuts on one inner edge of the engagement subregion in the circumferential direction to a state where the connecting protrusion abuts on another inner edge of the engagement subregion in the circumferential direction is not less than ½ of the prescribed periodic angle.

4. An inkjet recording apparatus, comprising:

the flow path connection mechanism claimed in claim 1, wherein the liquid is ink, and the inkjet recording apparatus uses the ink to perform printing.

* * * * *